United States Patent
Lin

(10) Patent No.: US 12,362,604 B2
(45) Date of Patent: Jul. 15, 2025

(54) WIRELESS POWER TRANSMITTER CIRCUIT HAVING LOW POWER PINGING AND CONTROL CIRCUIT AND METHOD THEREOF

(71) Applicant: Richtek Technology Corporation, Hsinchu (TW)

(72) Inventor: Fu-Chi Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 0 days.

(21) Appl. No.: 18/487,996

(22) Filed: Oct. 16, 2023

(65) Prior Publication Data
US 2024/0154468 A1    May 9, 2024

(30) Foreign Application Priority Data
Nov. 4, 2022  (TW) .................. 111142188

(51) Int. Cl.
*H02J 50/00* (2016.01)
*H02J 50/12* (2016.01)
*H02J 50/80* (2016.01)

(52) U.S. Cl.
CPC .............. *H02J 50/80* (2016.02); *H02J 50/12* (2016.02)

(58) Field of Classification Search
None
See application file for complete search history.

(56) References Cited

U.S. PATENT DOCUMENTS

| | | | |
|---|---|---|---|
| 2017/0141604 A1* | 5/2017 | Park | B60L 53/126 |
| 2018/0131243 A1* | 5/2018 | Hamaguchi | H02J 50/12 |
| 2019/0379241 A1* | 12/2019 | Kim | H02J 7/02 |
| 2021/0050742 A1* | 2/2021 | Callan | H02J 50/10 |
| 2022/0077719 A1* | 3/2022 | Sherman | H02J 50/80 |

FOREIGN PATENT DOCUMENTS

EP    3 896 822    * 10/2021    .............. H02J 50/12

* cited by examiner

*Primary Examiner* — Adi Amrany
(74) *Attorney, Agent, or Firm* — Huan-Yi Lin

(57) ABSTRACT

A wireless power transmitter circuit generates a wireless transmitting power during a power supply procedure, and determines whether there is a corresponding wireless power receiver circuit near by the wireless power transmitter circuit during a groping procedure. The groping procedure includes: step S10, generating a first analog groping transmitting signal; step S20, determining whether there is an electromagnetic inductive object near by the wireless power transmitter circuit according to an electrical characteristic related to the first analog groping transmitting signal, and when yes, proceeding to step S50, otherwise proceeding back to the step S10 after a first predetermined period; step S50: generating a digital groping transmitting signal; and step S60, determining whether there is a corresponding wireless power receiver circuit near by the wireless power transmitter circuit according to a reflect signal.

31 Claims, 21 Drawing Sheets

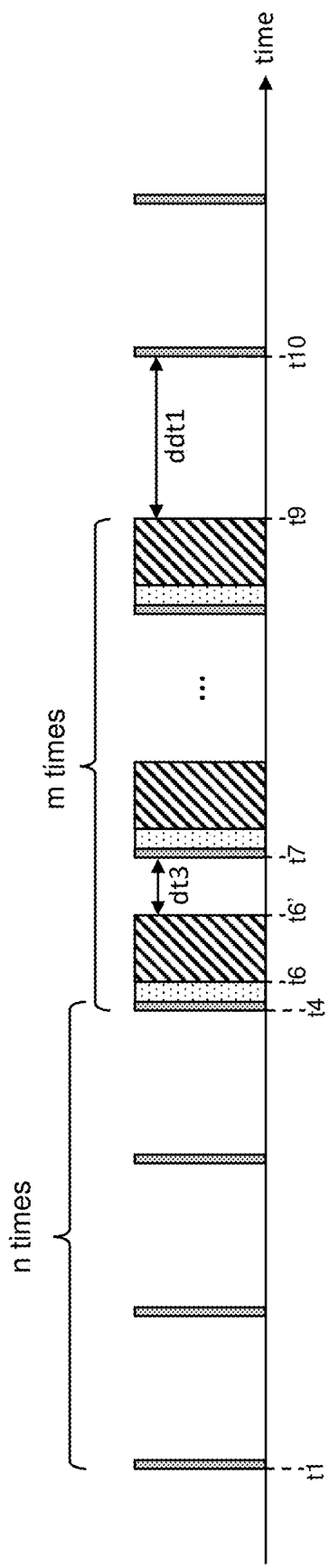

WIRELESS POWER TRANSMITTER CIRCUIT HAVING LOW POWER PINGING AND CONTROL CIRCUIT AND METHOD THEREOF

CROSS REFERENCE

The present invention claims priority to TW 111142188 filed on Nov. 4, 2022.

BACKGROUND OF THE INVENTION

Field of Invention

The present invention relates to a wireless power transmitter circuit with a pinging function, particularly a wireless power transmitter circuit with a power-saving pinging function. The present invention also relates to a transmitter control circuit and a control method for controlling the wireless power transmitter circuit.

Description of Related Art

Please refer to FIG. 1. FIG. 1 shows a signal-time relationship diagram of a wireless power transmitter circuit of a prior art. As shown in FIG. 1, in one clock period T1 of a pinging procedure, the wireless power transmitter circuit of the prior art generates an analog pinging transmission signal having an analog pinging pattern at time point t1 and next generates a digital transmission signal having a digital pinging pattern at time point t2, to determine whether a corresponding wireless power receiving circuit is near by the wireless power transmitter circuit. When it is determined that there is no corresponding wireless power receiving circuit is near by the wireless power transmitter circuit, after a disable period Td1, the pinging procedure enters the next clock period; when it is determined that a corresponding wireless power receiving circuit is near by the wireless power transmitter circuit, a power supply procedure is entered. The analog pinging transmission signal has an execution period Te1, and the digital transmission signal has an execution period Te2, wherein the execution period Te2 is longer than the execution period Te1.

The disadvantage of the above-mentioned prior art is that even if there is no corresponding wireless power receiving circuit near by the wireless power transmitter circuit, the wireless power transmitter circuit still needs to continuously generate the analog pinging transmission signal and the digital transmission signal in every clock period T1, and besides, the execution period Te2 of the digital transmission signal is relatively long and consumes more power. Therefore, in the absence of a corresponding wireless power receiving circuit, the wireless power transmitter circuit still consumes power for no reason and is inefficient.

Compared with the above-mentioned prior art, the wireless power transmitter circuit of the present invention provides a pinging function which can greatly reduce unnecessary power consumption in the pinging procedure, thereby improving the efficiency of the wireless power transmitter circuit.

SUMMARY OF THE INVENTION

From one perspective, the present invention provides a wireless power transmitter circuit, comprising: a power stage circuit, comprising a plurality of switches, coupled to a resonant transmitter circuit, wherein the resonant transmitter circuit comprises a transmitter coil and a resonant capacitor coupled to each other; and a transmitter control circuit, configured to control the plurality of switches according to a pulse width modulation (PWM) control signal to convert a direct current (DC) power to a wireless transmitting power in the resonant transmitter circuit to wirelessly supply power to a corresponding wireless power receiving circuit in a power supply procedure, the transmitter control circuit being configured to determine whether the corresponding wireless power receiving circuit is near by the resonant transmitter circuit in a pinging procedure, wherein the pinging procedure comprises: a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation; a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50, otherwise returning to the first analog pinging step S10 after waiting for a first preset period; a digital pinging step S50: generating the PWM control signal having a digital pinging pattern to control the resonant transmitter circuit to generate a corresponding digital pinging transmission signal; and a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure, otherwise returning to the first analog pinging step S10 after waiting for a second preset period.

In one embodiment, the pinging procedure further comprises: a second analog pinging step S30: generating the PWM control signal having a second analog pinging pattern to control the resonant transmitter circuit to generate a corresponding second analog pinging transmission signal, wherein when an electromagnetic inductive object is near by the resonant transmitter circuit, a second electrical characteristic of the second analog pinging transmission signal has a variation; a determination step S40: determining whether the electromagnetic inductive object is near by the resonant transmitter circuit according to the second electrical characteristic, and when determining that the electromagnetic inductive object is near by the resonant transmitter circuit, entering the digital pinging step S50, otherwise returning to the first analog pinging step S10 after waiting for a third preset period; and a determination step S65: determining whether the present pinging procedure has executed the second analog pinging step S30, and when determining that the second analog pinging step S30 has been executed, returning to the first analog pinging step S10 after waiting for a fourth preset period, otherwise returning to the first analog pinging step S10 after waiting for the second preset period; wherein, when the determination result of the determination step S20 is no, the second analog pinging step S30 is entered; and when the determination result of the determination step S60 is no, the determination step S65 is entered.

In one embodiment, the pinging procedure further comprises: a determination step S25: determining a number of times that the first analog pinging step S10 has been executed, wherein when the first analog pinging step S10 has been executed n times, the pinging procedure enters the second analog pinging step S30, otherwise the pinging procedure returns to the first analog pinging step S10 after waiting for the first preset period; wherein when the determination result of the determination step S20 is no, the determination step S25 is entered; and wherein n is an integer greater than 1.

In one embodiment, the digital pinging step S50 has a first execution period and the second analog pinging step S30 has a second execution period, wherein the first execution period is longer than the second execution period; and wherein the power of the second analog pinging transmission signal is less than the power of the digital pinging transmission signal.

In one embodiment, the first execution period is longer than or equal to 10 times the second execution period, or the first execution period is longer than or equal to 2 times the second execution period.

In one embodiment, the first analog pinging step S10 has a third execution period and the second execution period is longer than the third execution period; wherein the power of the first analog pinging transmission signal is less than the power of the second analog pinging transmission signal.

In one embodiment, the second execution period is longer than or equal to 10 times the third execution period, or the second execution period is longer than or equal to 5 times the third execution period.

In one embodiment, the first electrical characteristic is related to a quality factor (Q factor) of the resonant transmitter circuit.

In one embodiment, the determination step S20 further comprises: when an absolute value of a first detection signal is greater than a first threshold, determining whether the electromagnetic inductive object is near by the resonant transmitter circuit, wherein the first detection signal is related to a time derivative of the quality factor.

In one embodiment, in each of the first analog pinging step S10, the quality factor of the resonant transmitter circuit is measured to be a value of a first analog sensing signal, and a sequence of multiple values of the first analog sensing signal are subject to a discrete high-pass filtering procedure to generate the value of the first detection signal.

In one embodiment, the second electrical characteristic is related to a voltage across the transmitter coil and/or a transmitter coil current flowing through the transmitter coil.

In one embodiment, the determination step S40 further comprises: when an absolute value of a second detection signal is greater than a second threshold and/or greater than a third threshold, determining whether the electromagnetic inductive object is near by the resonant transmitter circuit, wherein the second detection signal is related to a time derivative of the voltage across the transmitter coil and/or a time derivative of the transmitter coil current.

In one embodiment, in each of the second analog pinging step S30, an average amplitude of the voltage across the transmitter coil, an average amplitude of the transmitter coil current, an average amplitude of the voltage across a resonant capacitor, or an average amplitude of a current of the resonant capacitor is measured to be a value of a second analog sensing signal, and a sequence of multiple values of the second analog sensing signal are subject to a discrete high-pass filtering procedure to generate the value of the second detection signal.

In one embodiment, the determination step S60 further comprises determining whether a corresponding wireless power receiving circuit is near by the resonant transmitter circuit according to whether the reflected signal complies with a communication protocol of in-band communication.

In one embodiment, when the determination result of the determination step S40 is no, entering a reset step S45: resetting a count of times of the first analog pinging step S10; next, returning to the first analog pinging step S10 after waiting for the third preset period.

In one embodiment, the pinging procedure further comprises: a determination step S70: determining a number of times that the digital pinging step S50 has been executed, wherein when the digital pinging step S50 has been executed m times continuously, the pinging procedure enters a reset step S75, otherwise the pinging procedure returns to the first analog pinging step S10 after waiting for the second preset period; and a reset step S75: resetting a count of times of the digital pinging step S50; and next returning to the first analog pinging step S10 after waiting for a pinging disable period; wherein when the determination result of the determination step S60 is no, the determination step S70 is entered.

In one embodiment, the transmitter control circuit comprises: a current sensor, configured to sense a transmitter coil current flowing through the transmitter coil to generate an analog current sensing signal; and/or a voltage sensor, configured to sense the voltage across the transmitter coil to generate an analog voltage sensing signal; wherein the transmitter control circuit is configured to generate the PWM control signal according to the analog current sensing signal and/or the analog voltage sensing signal, thereby controlling the plurality of switches.

In one embodiment, the first analog pinging step S10 further comprises: timing a preset period; wherein when the determination result of the determination step S20 or the determination step S60 is no, the pinging procedure returns to the first analog pinging step S10 after waiting for the end of the preset period.

In one embodiment, the first analog pinging step S10 further comprises: timing a preset period; wherein the pinging procedure further comprises: a second analog pinging step S30: generating the PWM control signal having a second analog pinging pattern to control the resonant transmitter circuit to generate a corresponding second analog pinging transmission signal, wherein when an electromagnetic inductive object is near by the resonant transmitter circuit, a second electrical characteristic of the second analog pinging transmission signal has a variation; and a determination step S40: determining whether the electromagnetic inductive object is near by the resonant transmitter circuit according to the second electrical characteristic, and when determining that the electromagnetic inductive object is near by the resonant transmitter circuit, entering the digital pinging step S50, otherwise returning to the first analog pinging step S10 after waiting for a third preset period; wherein when the determination result of the determination step S20 is no, the pinging procedure enters the second analog pinging step S30; and when the determination result of the determination step S60 or the determination step S40 is no, the pinging procedure returns to the first analog pinging step S10 after waiting for the end of the preset period.

From one perspective, the present invention provides a transmitter control circuit configured to control a wireless power transmitter circuit, wherein the wireless power transmitter circuit comprises: a power stage circuit which includes a plurality of switches and is coupled to a resonant transmitter circuit, wherein the resonant transmitter circuit comprises a transmitter coil and a resonant capacitor coupled to each other; the transmitter control circuit being configured to control the plurality of switches to convert a direct current (DC) power according to a pulse width modulation (PWM) control signal and generate a wireless transmitting power in the resonant transmitter circuit to wirelessly supply power to a corresponding wireless power receiving circuit in a power supply procedure, wherein the transmitter control circuit comprises: a current sensor, configured to sense a transmitter coil current flowing through the transmitter coil to generate an analog current sensing signal; and/or a voltage sensor, configured to sense the voltage across the transmitter coil to generate an analog voltage sensing signal; and a sub-control circuit, wherein the sub-control circuit is configured to generate the PWM control signal according to the analog current sensing signal and/or the analog voltage sensing signal, thereby controlling the plurality of switches; wherein the sub-control circuit is configured to determine whether the corresponding wireless power receiving circuit is near by the resonant transmitter circuit in a pinging procedure, wherein the pinging procedure comprises: a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation; a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50, otherwise returning to the first analog pinging step S10 after waiting for a first preset period; a digital pinging step S50: generating the PWM control signal having a digital pinging pattern to control the resonant transmitter circuit to generate a corresponding digital pinging transmission signal; and a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure, otherwise returning to the first analog pinging step S10 after waiting for a second preset period.

From one perspective, the present invention provides a transmission control method configured to control a wireless power transmitter circuit, comprising: a power supply procedure: controlling the wireless power transmitter circuit to generate a wireless transmitting power to wirelessly supply power to a corresponding wireless power receiving circuit; and a pinging procedure: determining whether a corresponding wireless power receiving circuit is near by the wireless power transmitter circuit, wherein the pinging procedure comprises: a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation; a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50, otherwise returning to the first analog pinging step S10 after waiting for a first preset period; a digital pinging step S50: generating the PWM control signal having a digital pinging pattern to control the resonant transmitter circuit to generate a corresponding digital pinging transmission signal; and a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure, otherwise returning to the first analog pinging step S10 after waiting for a second preset period.

In one embodiment, the first electrical characteristic is related to a quality factor (Q factor) of the resonant transmitter circuit, and the second electrical characteristic is related to a voltage across the transmitter coil and/or a transmitter coil current through the transmitter coil.

The objectives, technical details, features, and effects of the present invention will be better understood with regard to the detailed description of the embodiments below, with reference to the attached drawings.

BRIEF DESCRIPTION OF THE DRAWINGS

FIG. 11A to FIG. 11C respectively show signal-time relationship diagrams corresponding to FIG. 10 according to several embodiments of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
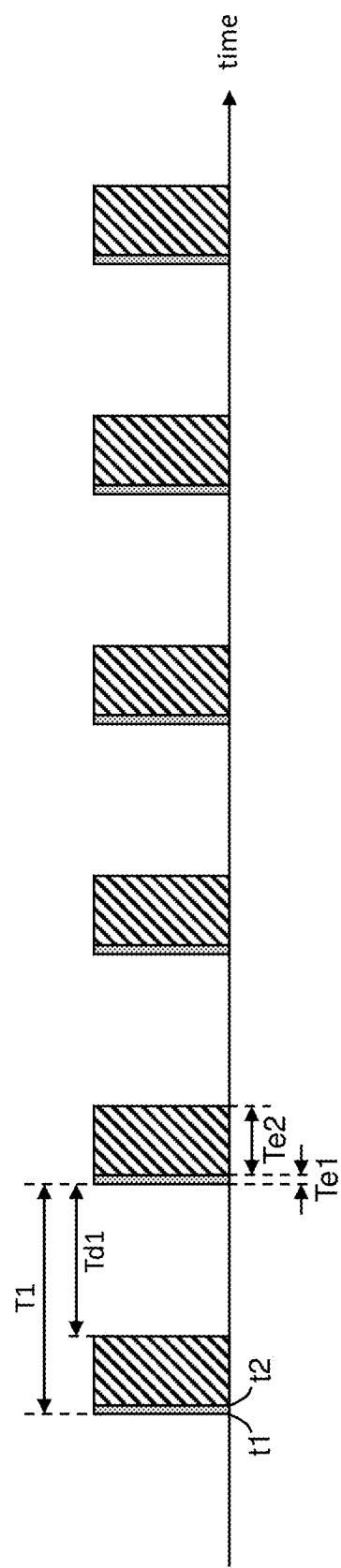
FIG. 1 shows a signal-time relationship diagram of a wireless power transmitter circuit of the prior art.
Figure 2:
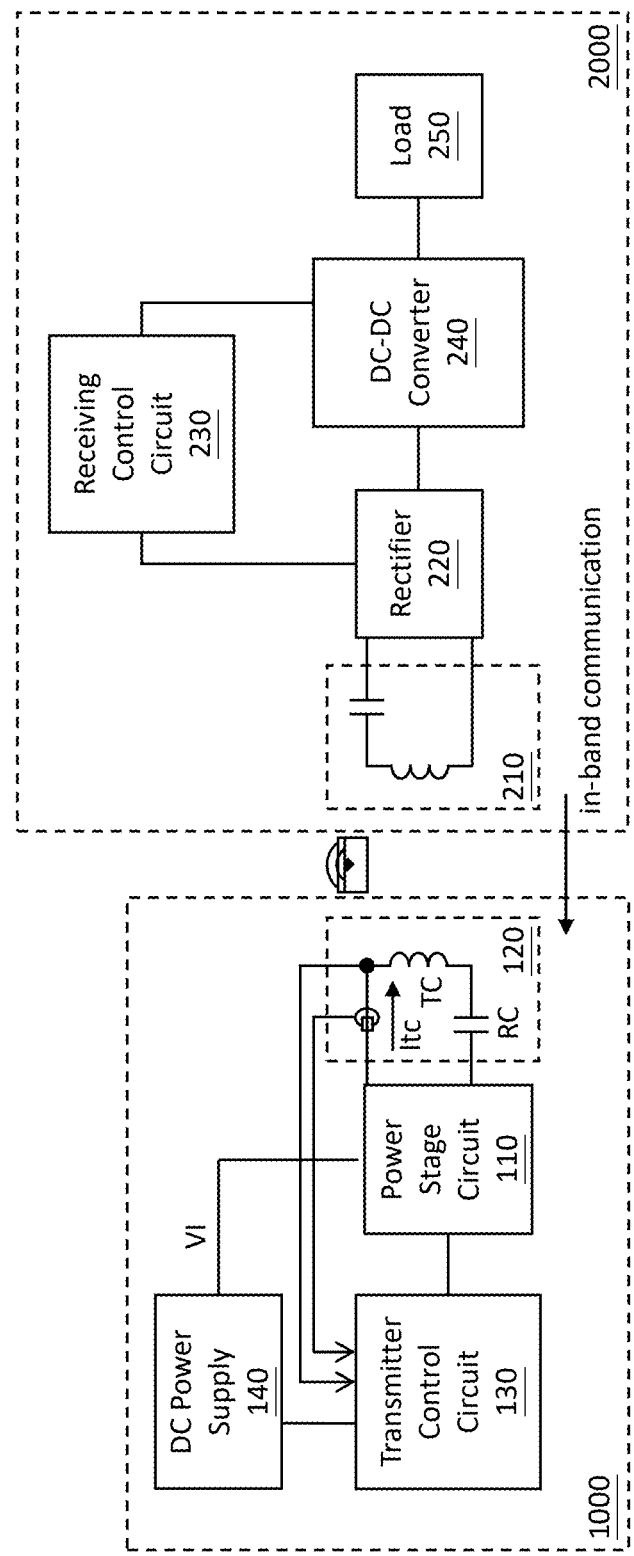
FIG. 2 shows a block diagram of the wireless power transmitter circuit according to an embodiment of the present invention.

Please refer to FIG. 2. FIG. 2 shows a block diagram of the wireless power transmitter circuit according to an embodiment of the present invention. As shown in FIG. 2, in one embodiment, the wireless power transmitter circuit 1000 includes: a power stage circuit 110, a resonant transmitter circuit 120, a transmitter control circuit 130, and a direct current (DC) power supply 140 (e.g., including a DC voltage VI). In one embodiment, the power stage circuit 110 is, for example, a half-bridge power stage circuit or a full-bridge power stage circuit, including plural switches, and is coupled to the resonant transmitter circuit 120. The resonant transmitter circuit 120 includes a transmitter coil TC (i.e., an inductor) and a resonant capacitor RC coupled to each other. In one embodiment, the transmitter control circuit 130 is configured to determine whether a corresponding wireless power receiving circuit is near by the resonant transmitter circuit 120 in the pinging procedure P100. The detailed operation steps of the pinging procedure P100 will be described later. In one embodiment, when it is determined that a corresponding wireless power receiving circuit (e.g., the wireless power receiving circuit 2000 in FIG. 2) is near by the resonant transmitter circuit 120, the transmitter control circuit 130 controls the plural switches according to a pulse width modulation (PWM) control signal to convert a direct current (DC) power supply 140 to a wireless transmitting power in the resonant transmitter circuit 120, so as to wirelessly supply power to the corresponding wireless power receiving circuit 2000 in a power supply procedure.

In one embodiment, the wireless power receiving circuit 2000 includes a resonant receiving circuit 210, a rectifier 220, a receiving control circuit 230, a DC-DC converter 240, and a load 250. In one embodiment, the DC-DC converter 240 can be, for example, a linear regulator or a dc-to-dc switching converter. In the present embodiment, the resonant receiving circuit 210 is configured to receive the wireless transmitting power generated by the resonant transmitter circuit 120, and supply power to the load 250 after being rectified by the rectifier 220 and regulated by the DC-DC converter 240. In one embodiment, the resonant transmitter circuit 120 and the resonant receiving circuit 210 can execute in-band communication.

Figure 3A:
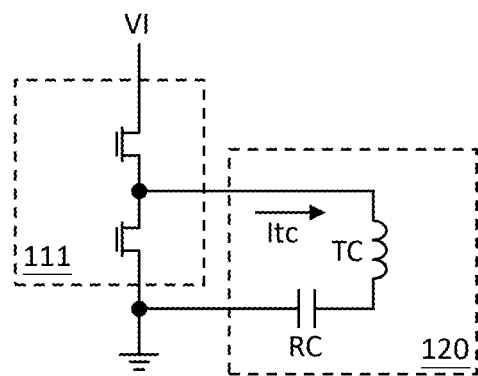
FIG. 3A and FIG. 3B show schematic diagrams of the power stage circuit in the wireless power transmitter circuit according to two embodiments of the present invention.
Figure 3B:
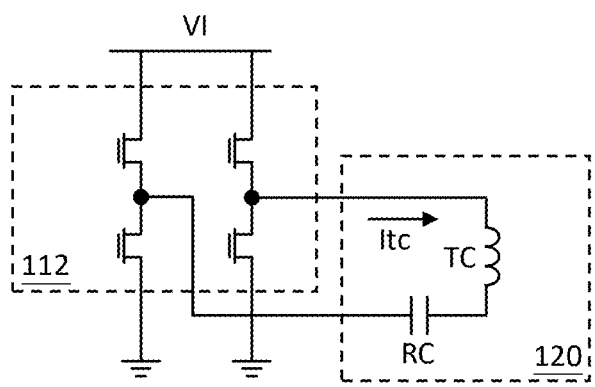

Please refer to FIG. 3A and FIG. 3B. FIG. 3A and FIG. 3B show schematic diagrams of the power stage circuit in the wireless power transmitter circuit according to two embodiments of the present invention. In one embodiment, the power stage circuit 110 is, for example, a half-bridge power stage circuit 111 (as shown in FIG. 3A) or a full-bridge power stage circuit 112 (as shown in FIG. 3B).

Figure 4A:
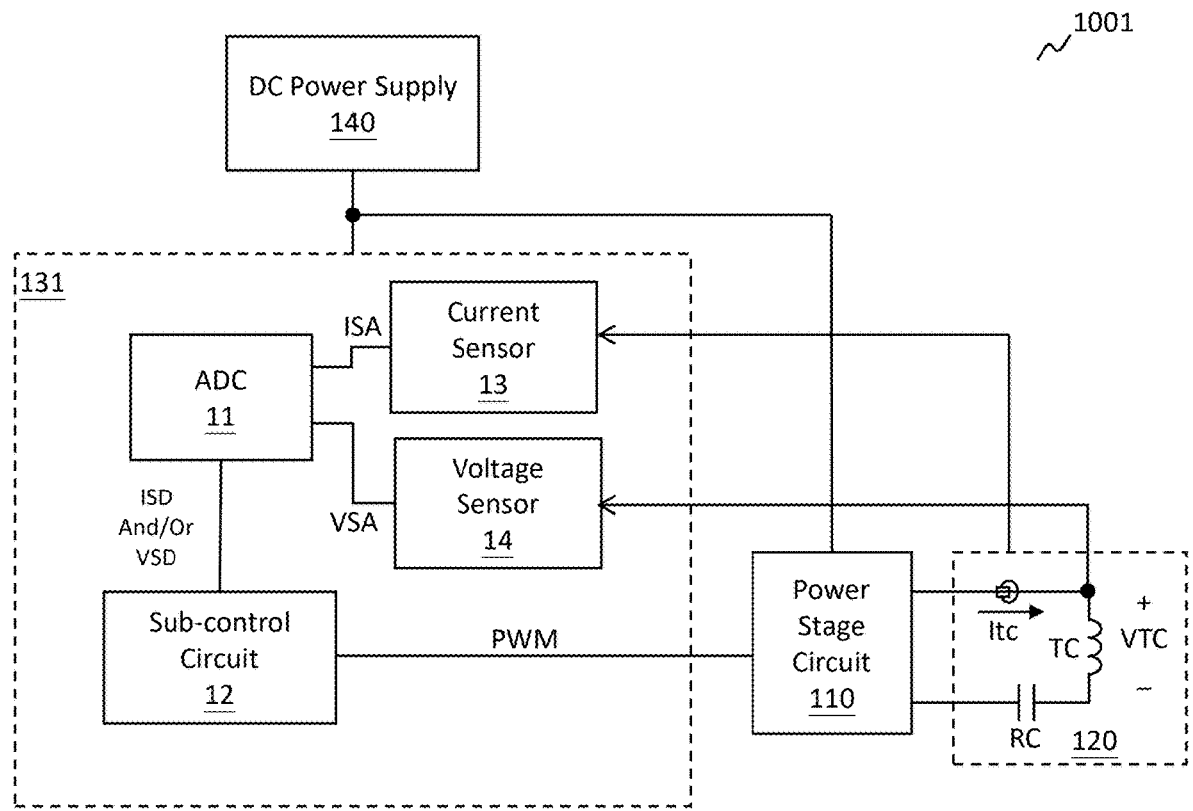
FIG. 4A and FIG. 4B show block diagrams of the wireless power transmitter circuit according to two embodiments of the present invention.
Figure 4B:
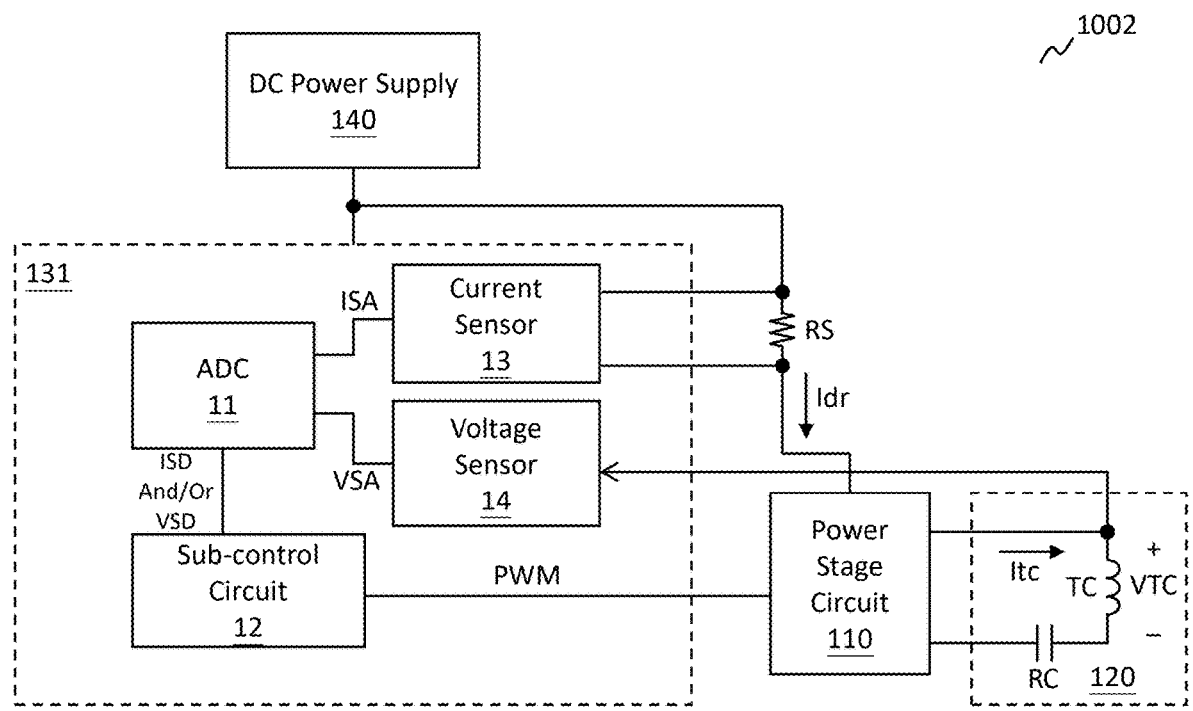

Please refer to FIG. 4A and FIG. 4B. FIG. 4A and FIG. 4B show block diagrams of the wireless power transmitter circuit according to two embodiments of the present invention. The wireless power transmitter circuit 1001 of FIG. 4A is similar to the wireless power transmitter circuit 1000 of FIG. 2. In one embodiment, the wireless power transmitter circuit 1001 includes a transmitter control circuit 131, and the transmitter control circuit 131 includes an analog-to-digital converter (ADC) 11, a sub-control circuit 12, a current sensor 13, and a voltage sensor 14. In one embodiment, the current sensor 13 is configured to sense a transmitter coil current signal Itc flowing through the transmitter coil TC to generate an analog current sensing signal ISA. In one embodiment, the voltage sensor 14 is configured to sense a cross-voltage signal VTC of the transmitter coil TC to generate an analog voltage sensing signal VSA. In one embodiment, the analog-to-digital converter 11 generates a digital current sensing signal ISD and/or a digital voltage sensing signal VSD according to the analog current sensing signal ISA and/or the analog voltage sensing signal VSA, and the sub-control circuit 12 is configured to generate a PWM control signal PWM according to the digital current sensing signal ISD and/or the digital voltage sensing signal VSD to control the plural switches of the power stage circuit 110, so that the resonant transmitter circuit 120 generates a corresponding transmission signal.

The wireless power transmitter circuit 1002 of FIG. 4B is similar to the wireless power transmitter circuit 1001 of FIG. 4A. In one embodiment, the transmitter control circuit 131 of the wireless power transmitter circuit 1002 is substantially the same as the transmitter control circuit 131 of the wireless power transmitter circuit 1001, but is different in that, in the transmitter control circuit 131 of the wireless power transmitter circuit 1002, the current sensor 13 senses a driving current Idr through a sensing resistor RS coupled to the power stage circuit 110, wherein the driving current Idr is related to the transmitter coil current signal.

Figure 5A:
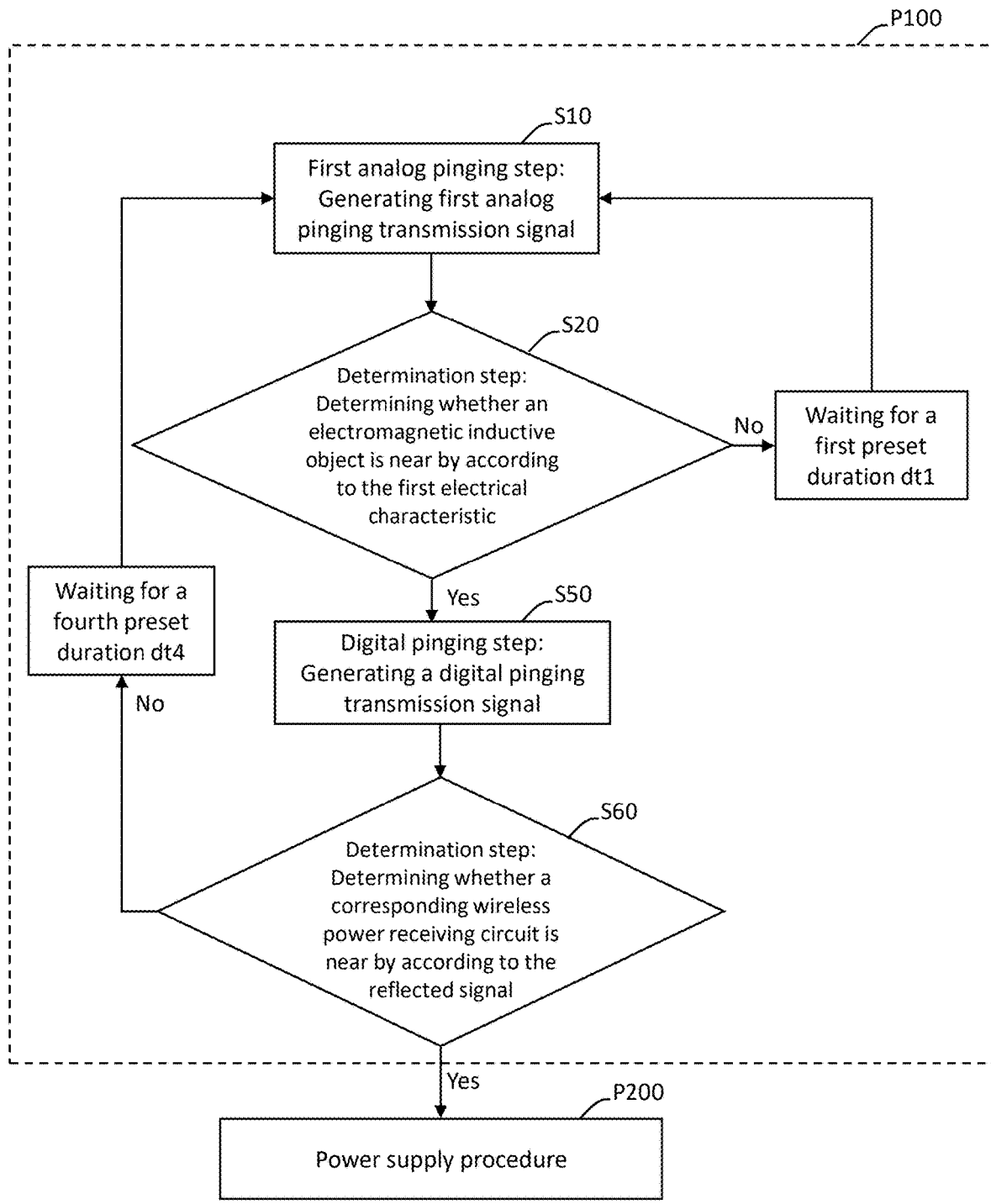
FIG. 5A shows an operation flow chart of the wireless power transmitter circuit according to an embodiment of the present invention.

Please refer to FIG. 2 and FIG. 5A. FIG. 5A shows an operation flow chart of the wireless power transmitter circuit according to an embodiment of the present invention. As shown in FIG. 5A, in one embodiment, the wireless power transmitter circuit 1000 executes a pinging procedure P100 which includes: a first analog pinging step S10, a determination step S20, a digital pinging step S50, and a determination step S60. In one embodiment, when the wireless power transmitter circuit 1000 enters the pinging procedure P100, first, a first analog pinging step S10 is executed: generating a PWM control signal having a first analog pinging pattern to control the resonant transmitter circuit 120 to generate a corresponding first analog pinging transmission signal, wherein when an electromagnetic inductive object is near by the resonant transmitter circuit 120, a first electrical characteristic corresponding to the first analog pinging transmission signal has a variation. In one embodiment, the first electrical characteristic is, for example, related to the quality factor (Q factor) of the resonant transmitter circuit 120. The above-mentioned electromagnetic inductive objects may be a wireless power receiving circuit, or may be other objects with electromagnetic inductive characteristics.

After the first analog pinging step S10 is completed, next, the pinging procedure P100 enters the determination step S20: determining whether an electromagnetic inductive object is near by the resonant transmitter circuit 120 according to the first electrical characteristic, wherein when it is determined that the electromagnetic inductive object is near by the resonant transmitter circuit 120, the pinging procedure P100 enters the digital pinging step S50, otherwise the pinging procedure P100 returns to the first analog pinging step S10 after waiting for a first preset duration dt1.

When the determination result of the determination step S20 is yes, the pinging procedure P100 enters the digital pinging step S50: generating a PWM control signal having a digital pinging pattern to control the resonant transmitter circuit 120 to generate a corresponding digital pinging transmission signal.

After the digital pinging step S50 is completed, next, the pinging procedure P100 enters the determination step S60: determining whether a corresponding wireless power receiving circuit is near by the resonant transmitter circuit 120 according to the reflected signal received by the resonant transmitter circuit 120, wherein when it is determined that the corresponding wireless power receiving circuit is near by the resonant transmitter circuit 120, the power supply procedure P200 is entered, otherwise the pinging procedure P100 returns to the first analog pinging step S10 after waiting for a fourth preset duration dt4.

In one embodiment, the determination step S60 further includes: determining whether a corresponding wireless power receiving circuit is near by the resonant transmitter circuit 120 according to whether the reflected signal complies with a communication protocol of in-band communication. To be more specific, in the case where a corresponding wireless power receiving circuit is near by the resonant transmitter circuit 120, when the resonant transmitter circuit 120 generates a digital pinging transmission signal, the wireless power receiving circuit can perform in-band communication by modulating, for example, the impedance of its resonant receiving circuit, and the resonant transmitter circuit 120 can demodulate the signal contained in the reflected signal to obtain the message transmitted by the wireless power receiving circuit to confirm the existence and proximity of the wireless power receiving circuit. In one embodiment, the digital pinging transmission signal can include in-band communication information in digital form.

Figure 5B:
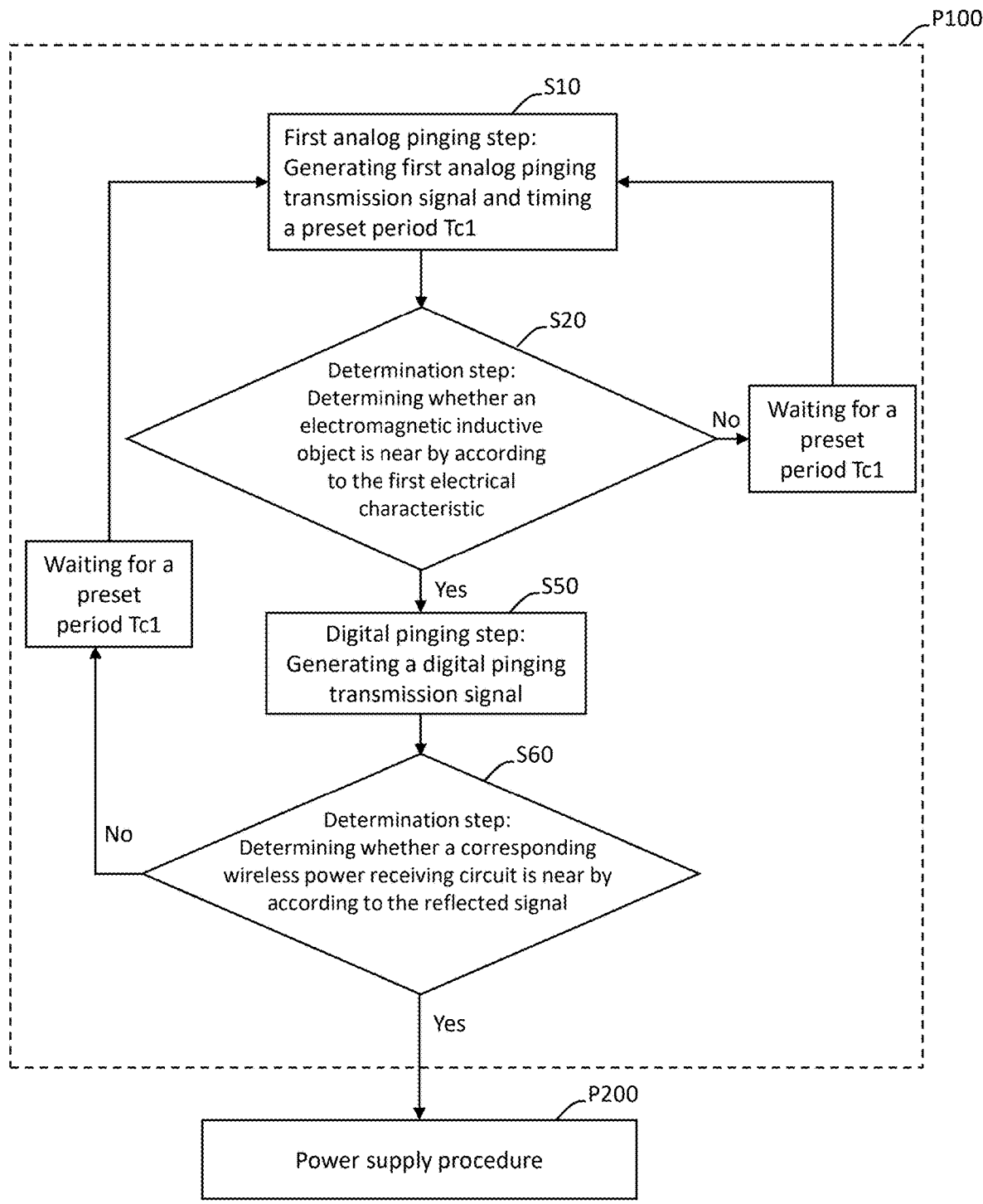
FIG. 5B shows an operation flow chart of the wireless power transmitter circuit according to an embodiment of the present invention.

FIG. 5B shows an operation flow chart of the wireless power transmitter circuit according to an embodiment of the present invention. The operation flow of FIG. 5B is similar to the operation flow of FIG. 5A, but is different in that, in the embodiment of FIG. 5B, the first analog pinging step S10 further includes: timing a preset period Tc1. In the embodiment of FIG. 5B, when the determination result of the determination step S20 or the determination step S60 is no, the pinging procedure P100 returns to the first analog pinging step S10 after waiting for the end of the preset period Tc1. It should be noted that, compared with the embodiment of FIG. 5A, in the embodiment of FIG. 5B, there are no first preset duration dt1 and fourth preset duration dt4.

Figure 6A:
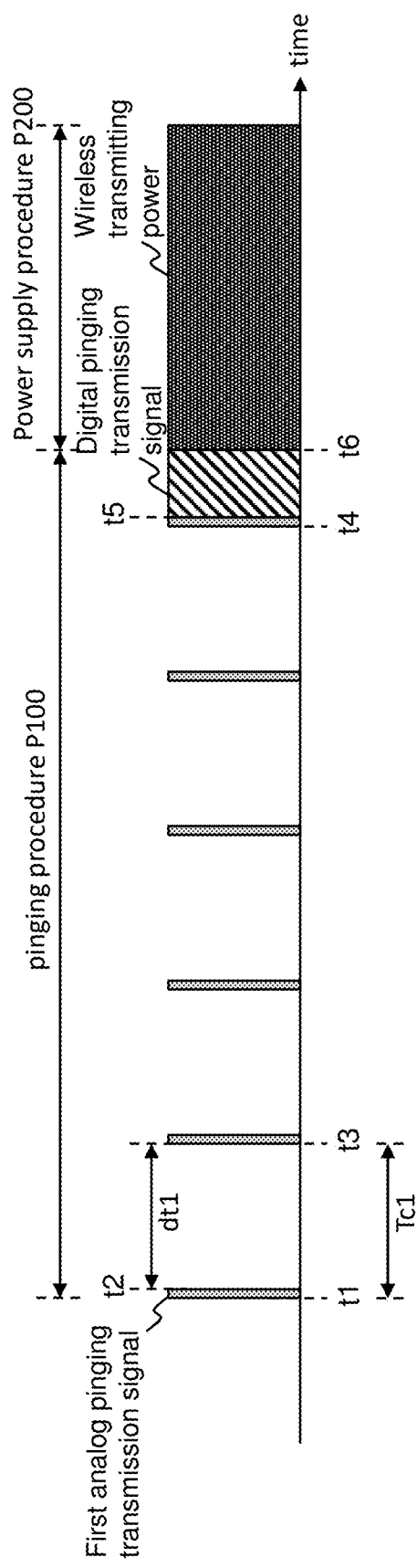
FIG. 6A and FIG. 6B respectively show signal-time relationship diagrams corresponding to the two embodiments of FIG. 5A or FIG. 5B.
Figure 6B:
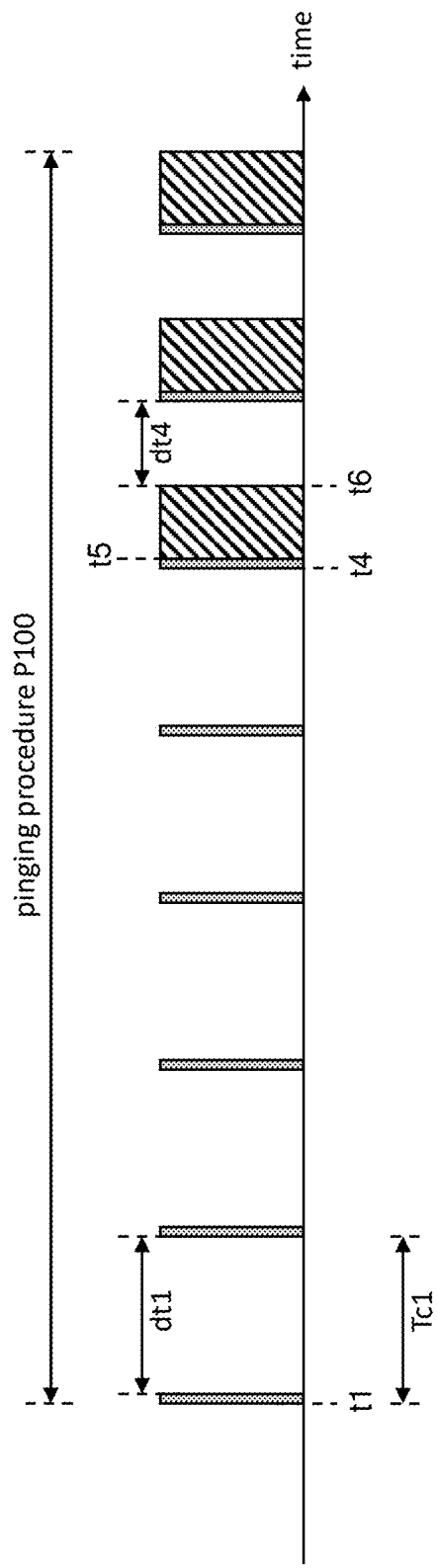

FIG. 6A and FIG. 6B respectively show signal-time relationship diagrams corresponding to the two embodiments of FIG. 5A or FIG. 5B. Please refer to FIG. 5A and FIG. 6A at the same time. In one embodiment, as shown in FIG. 6A, the wireless power transmitter circuit starts (enters) the pinging procedure P100 at time point t1; first, a first analog pinging step S10 is executed to generate a PWM control signal having a first analog pinging pattern to control the resonant transmitter circuit 120 to generate a corresponding first analog pinging transmission signal (as shown in FIG. 6A, wherein the gray bar area is the duration of the first analog pinging transmission signal; an example of the detailed waveform thereof is item 61 in FIG. 7A of U.S. patent Ser. No. 10/916,972B2). Next, the determination step S20 is entered at time point t2. In the present embodiment, judging according to the first electrical characteristic of the first analog pinging transmission signal, there is no electromagnetic inductive object near by the resonant transmitter circuit 120, so after waiting for the first preset period first preset duration dt1, the pinging procedure P100 returns to the first analog pinging step S10 at time point t3. It should be noted that, in the present embodiment, if there is no electromagnetic inductive object near by the resonant transmitter circuit 120, the above steps are continuously repeated (e.g., from time point t1 to time point t4 in FIG. 6A).

Figure 7A:
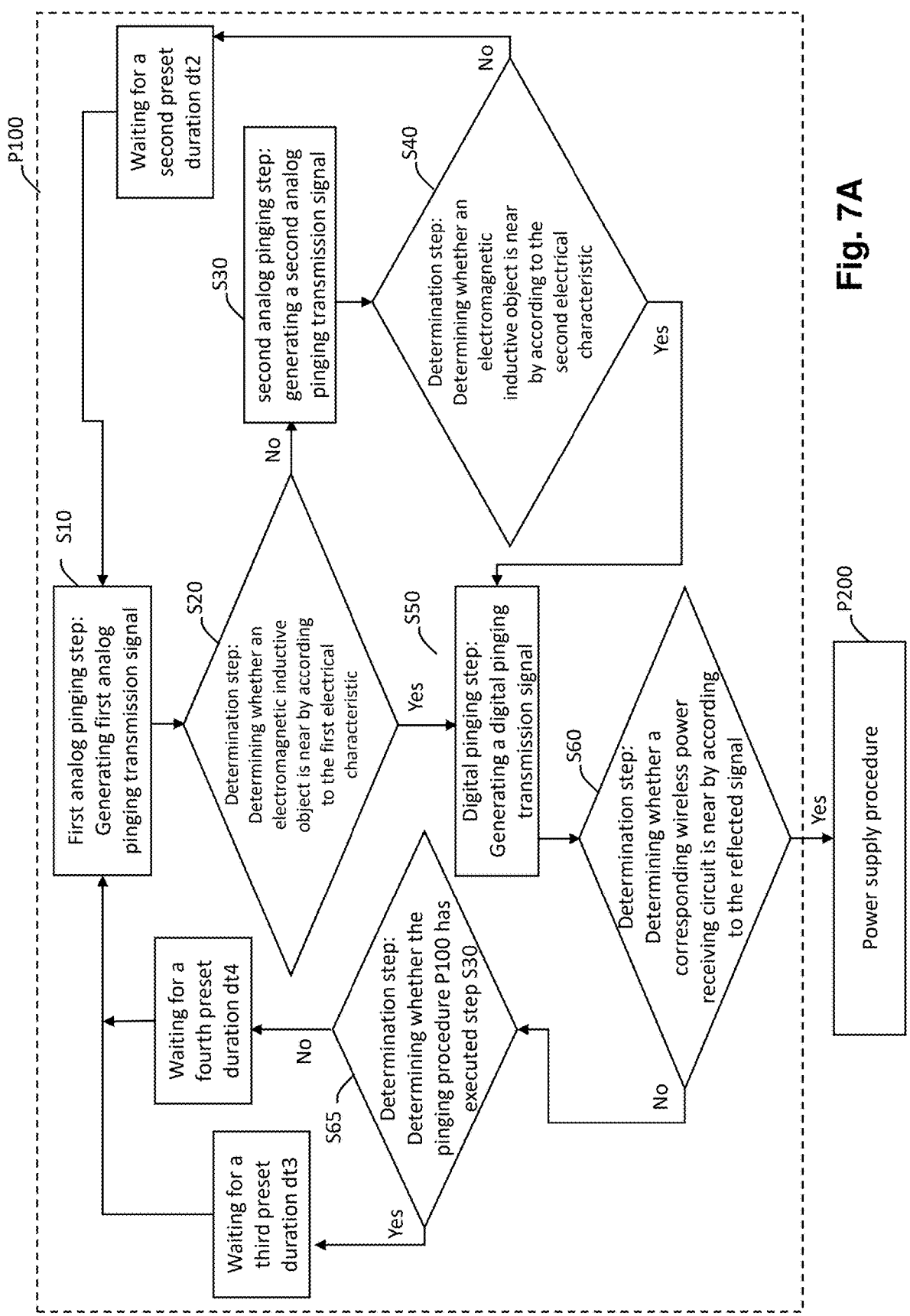
FIG. 7A shows an operation flow chart of the wireless power transmitter circuit according to an embodiment of the present invention.

In one embodiment, at time point t5 in FIG. 6A, the determination step S20 determines that there is a variation in the first electrical characteristic of the first analog pinging transmission signal, that is, it is determined that an electromagnetic inductive object is near by the resonant transmitter circuit 120, and the digital pinging step S50 is entered to generate a PWM control signal having a digital pinging pattern to control the resonant transmitter circuit 120 to generate a corresponding digital pinging transmission signal (as shown in FIG. 6A, wherein the gray bar area is the duration of the digital pinging transmission signal; an example of the detailed waveform thereof is item 62 in FIG. 7A of U.S. patent Ser. No. 10/916,972B2). The first electrical characteristic is, for example, the quality factor of the resonant transmitter circuit 120; the details of how to determine whether an electromagnetic inductive object is near by the resonant transmitter circuit 120 according to the variation of the quality factor of the resonant transmitter circuit 120 will be described later.

Still referring to FIG. 6A, the resonant transmitter circuit 120 next enters the determination step S60 at time point t6. In the present embodiment, it is determined that the corresponding wireless power receiving circuit is near by the resonant transmitter circuit according to the reflected signal received by the resonant transmitter circuit 120, so the resonant transmitter circuit 120 enters the power supply procedure P200 and generates the wireless transmitting power (as shown in FIG. 6A, wherein the dotted bar area is the duration of the wireless transmitting power), to wirelessly supply power to a corresponding wireless power receiving circuit.

Please refer to FIG. 5A and FIG. 6B at the same time. In the embodiment of FIG. 6B, the operation flow from time point t1 to time point t6 is the same as that in the embodiment of FIG. 6A, so these parts are not repeatedly explained here. In the embodiment of FIG. 6B, the determination step S60 is entered at time point t6. In the present embodiment, it is determined that there is no corresponding wireless power receiving circuit near by the resonant transmitter circuit 120 according to the reflected signal received by the resonant transmitter circuit 120; therefore, the pinging procedure P100 returns to the first analog pinging step S10 after waiting for the fourth preset duration dt4. Specifically, in the present embodiment, the electromagnetic inductive object near by the resonant transmitter circuit 120 is an object with electromagnetic inductive characteristics, but is not the corresponding wireless power receiving circuit. Therefore, the determination step S20 at time point t5 determines that an electromagnetic inductive object is near by the resonant transmitter circuit 120, but the determination step S60 at time point t6 determines that there is no corresponding wireless power receiving circuit near by the resonant transmitter circuit 120; in this case, the power supply procedure P200 is not entered. In the present embodiment, if there is any object with electromagnetic inductive characteristics approaching the resonant transmitter circuit 120, the above steps are repeated continuously, as shown in the period after time point t4 in FIG. 6B.

Please refer to FIG. 5B, FIG. 6A, and FIG. 6B at the same time. In one embodiment, when FIG. 6A or FIG. 6B corresponds to the operation flow of FIG. 5B, and the operation details thereof are substantially the same as those corresponding to FIG. 5A, but is different is that, the time interval between the starting points of two neighboring first analog pinging steps S10 in the pinging procedure P100 is always the preset period Tc1.

Please refer to FIG. 2 and FIG. 7A at the same time. FIG. 7A shows an operation flow chart of the wireless power transmitter circuit according to an embodiment of the present invention. The operation flow of FIG. 7A is similar to the operation flow of FIG. 5A, with the differences described below. In the embodiment of FIG. 7A, the pinging procedure P100 of the wireless power transmitter circuit 1000 further includes: a second analog pinging step S30, a determination step S40, and a determination step S65. In one embodiment, when the determination result of the determination step S20 is no, the second analog pinging step S30 is entered: generating a PWM control signal having a second analog pinging pattern to control the resonant transmitter circuit 120 to generate a corresponding second analog pinging transmission signal, wherein when an electromagnetic inductive object is near by the resonant transmitter circuit 120, the second electrical characteristic corresponding to the second analog pinging transmission signal has a variation. The details of the second electrical characteristic and the determination of its variation will be described later.

After the second analog pinging step S30 is completed, next, the pinging procedure P100 enters the determination step S40: determining whether an electromagnetic inductive object is near by the resonant transmitter circuit 120 according to the second electrical characteristic, and when it is determined that an electromagnetic inductive object is near by the resonant transmitter circuit 120, the pinging procedure P100 enters the digital pinging step S50, otherwise the pinging procedure P100 returns to the first analog pinging step S10 after waiting for the third preset period dt3 a second preset duration dt2.

In one embodiment, when the determination result of the determination step S60 is no, the pinging procedure P100 enters the determination step S65: determining whether the present pinging procedure P100 has executed the second analog pinging step S30. When it is determined that the second analog pinging step S30 has been executed, the pinging procedure P100 returns to the first analog pinging step S10 after waiting for a third preset duration dt3, otherwise the pinging procedure P100 returns to the first analog pinging step S10 after waiting for the fourth preset duration dt4.

Figure 7B:
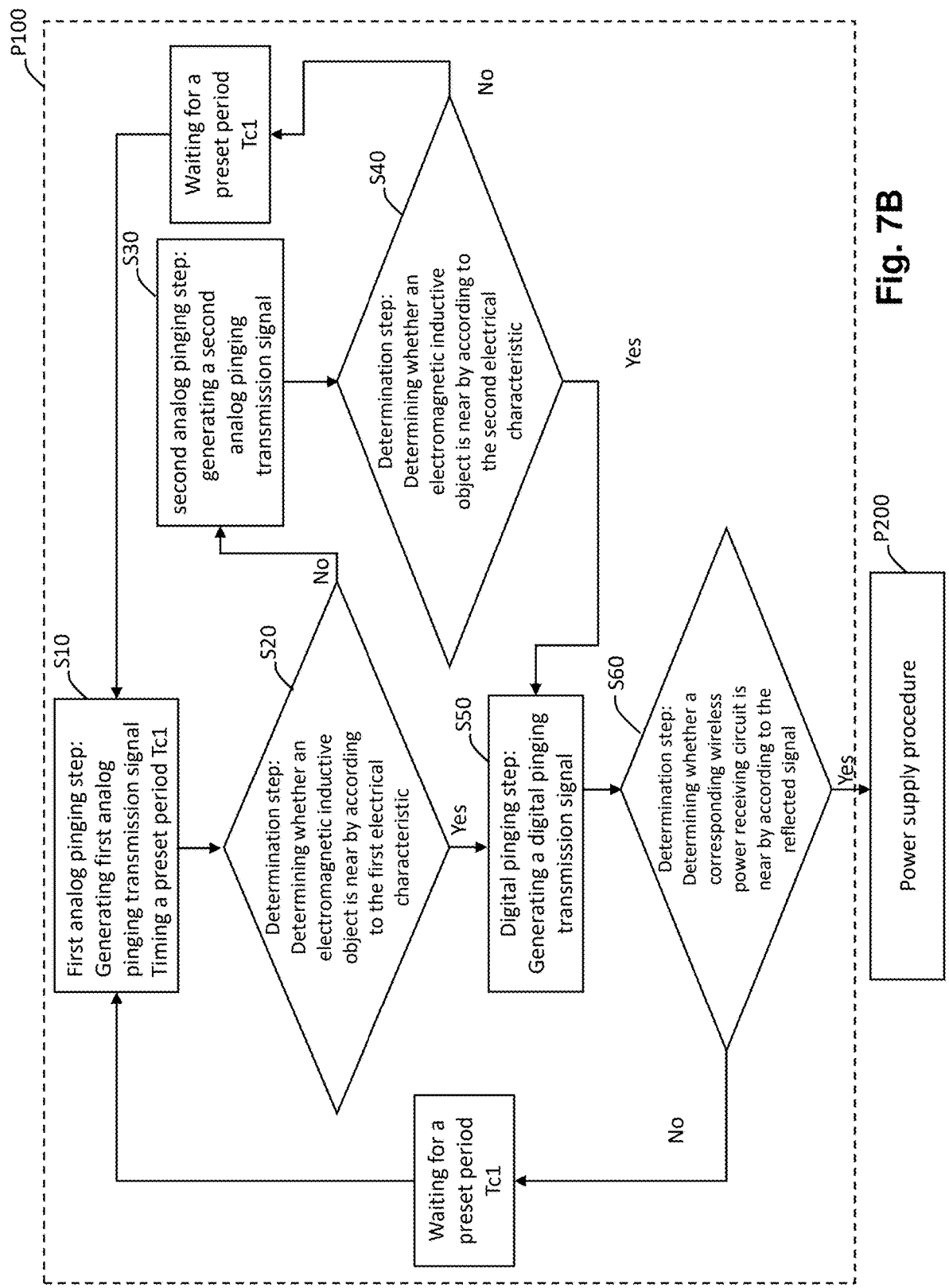
FIG. 7B shows an operation flow chart of the wireless power transmitter circuit according to an embodiment of the present invention.

FIG. 7B shows an operation flow chart of the wireless power transmitter circuit according to an embodiment of the present invention. The operation flow of FIG. 7B is similar to that of FIG. 7A, but is different in that in the embodiment of FIG. 7B, the pinging procedure P100 does not include the determination step S65, and the first analog pinging step S10 further includes: timing a preset period Tc1. In the present embodiment, when the determination result of the determination step S60 or the determination step S40 is no, the pinging procedure P100 returns to the first analog pinging step S10 after waiting for the end of the preset period Tc1. It should be noted that, compared with the embodiment of FIG. 7A, in the embodiment of FIG. 7B, there are no fourth preset duration dt4, second preset duration dt2, and third preset duration dt3.

Figure 8A:
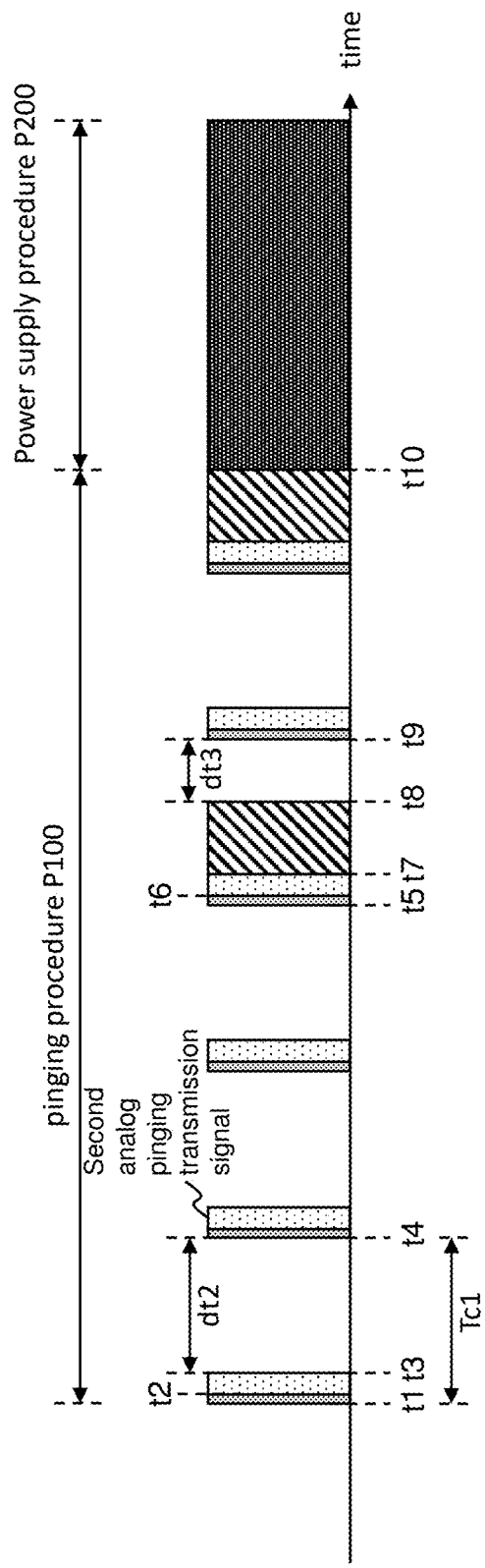
FIG. 8A and FIG. 8B respectively show signal-time relationship diagrams corresponding to the two embodiments of FIG. 7A or FIG. 7B.
Figure 8B:
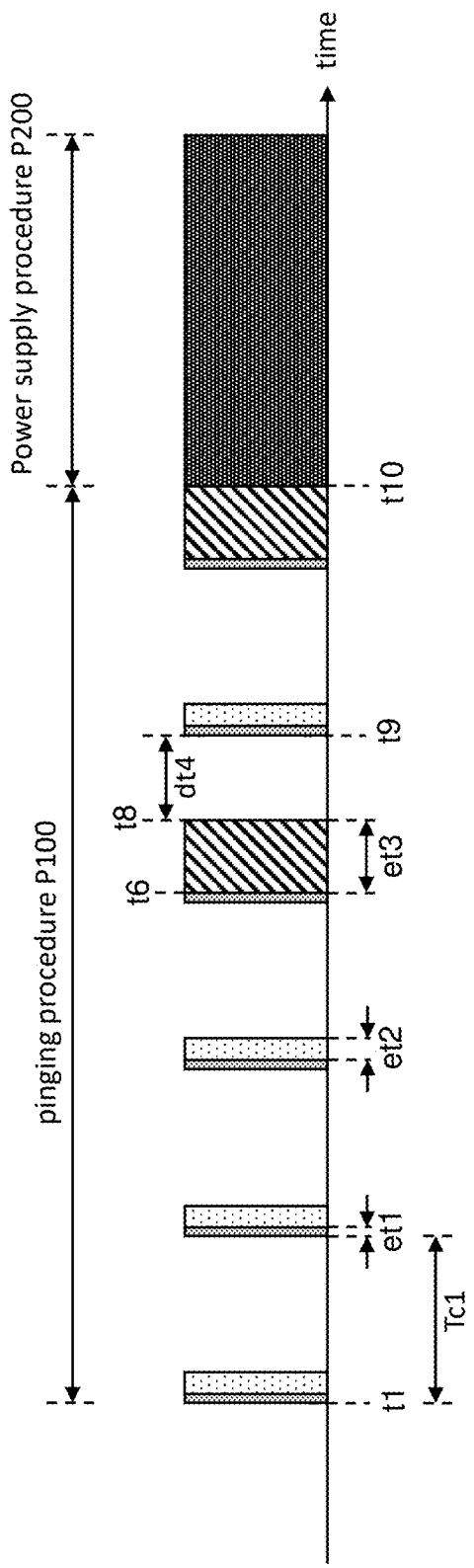
Figure 9:
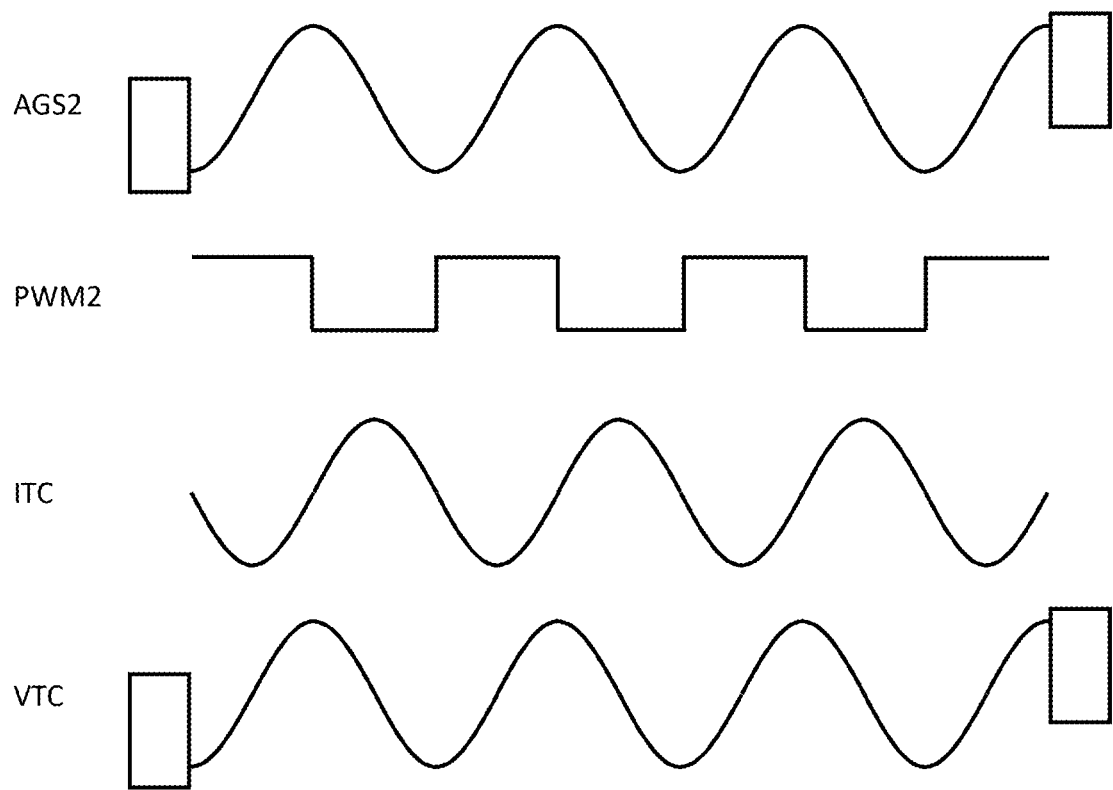
FIG. 9 shows a waveform diagram of the signals generated in the second analog pinging step according to an embodiment of the present invention.

FIG. 8A and FIG. 8B respectively show signal-time relationship diagrams corresponding to the two embodiments of FIG. 7A or FIG. 7B. FIG. 9 shows the waveform diagram of the signals generated in the second analog pinging step according to an embodiment of the present invention. Please refer to FIG. 7A, FIG. 8A, and FIG. 9 at the same time. In one embodiment, as shown in FIG. 8A, the pinging procedure P100 is entered at time point t1, and the first analog pinging step S10 is executed (for details, please refer to the description of FIG. 6A). Subsequently, the determination step S20 is entered at time point t2. In the present embodiment, it is determined that there is no electromagnetic inductive object near by the resonant transmitter circuit 120 according to the first electrical characteristic of the first analog pinging transmission signal. Therefore, the second analog pinging step S30 is entered, to generate a PWM control signal PWM2 having a second analog pinging pattern (please refer to, e.g., the waveform of PWM2 in FIG. 9 for its detailed waveform pattern) to control the resonant transmitter circuit 120 to generate a corresponding second analog pinging transmission signal AGS2 (as shown in FIG. 8A, wherein the fine dotted bar area is the duration of the second analog pinging transmission signal; please refer to, e.g., the waveform of AGS2 in FIG. 9 for its detailed waveform pattern). Subsequently, the determination step S40 is entered at time point t3. In the present embodiment, it is determined that there is no electromagnetic inductive object near by the resonant transmitter circuit 120 according to the second electrical characteristic of the second analog pinging transmission signal. Therefore, the pinging procedure P100 returns to the first analog pinging step S10 at time point t4 after waiting for the second preset duration dt2. In FIG. 8A, the above steps are repeated from time point t4 to time point t5.

In one embodiment, at time point t6 in FIG. 8A, the determination step S20 determines that there is no variation in the first electrical characteristic of the first analog pinging transmission signal, that is, it is determined that there is no electromagnetic inductive object near by the resonant transmitter circuit 120; therefore, the second analog pinging step S30 is entered, and a corresponding second analog pinging transmission signal AGS2 is generated. Next, the determination step S40 is entered at time point t7. In the present embodiment, it is determined that there is an electromagnetic inductive object near by the resonant transmitter circuit 120 according to the second electrical characteristic of the second analog pinging transmission signal. Therefore, the digital pinging step S50 is entered to generate a corresponding digital pinging transmission signal. Next, the determination step S60 is entered at time point t8. In the present embodiment, it is determined that there is no corresponding wireless power receiving circuit near by the resonant transmitter circuit 120 according to the reflected signal received by the resonant transmitter circuit 120. Therefore, the determination step S65 is entered. In the determination step S65, it is determined that the second analog pinging step S30 has been executed, so the pinging procedure P100 returns to the first analog pinging step S10 at time point t9 after waiting for the third preset duration dt3. In one embodiment, at time point t10 in FIG. 8A, the determination step S60 determines that the corresponding wireless power receiving circuit is near by the resonant transmitter circuit 120 according to the reflected signal received by the resonant transmitter circuit 120; in this case the power supply procedure P200 is entered, and the resonant transmitter circuit 120 starts generating the wireless transmitting power.

Please refer to FIG. 7A and FIG. 8B at the same time. In the embodiment of FIG. 8B, the operation flow from time point t1 to time point t6 is the same as that of the embodiment of FIG. 8A, which is not repeatedly explained here. In the embodiment of FIG. 8B, the determination step S20 is entered at time point t6, wherein it is determined that an electromagnetic inductive object is near by the resonant transmitter circuit 120. Hence, the digital pinging step S50 is entered to generate a corresponding digital pinging transmission signal. Next, the determination step S60 is entered at time point t8. In the present embodiment, it is determined that there is no corresponding wireless power receiving circuit near by the resonant transmitter circuit 120 according to the reflected signal received by the resonant transmitter circuit 120. Therefore, the determination step S65 is entered, and in the determination step S65, it is determined that the second analog pinging step S30 has not been executed, so the pinging procedure P100 returns to the first analog pinging step S10 at time point t9 after waiting for the fourth preset duration dt4. In one embodiment, at time point t10 in FIG. 8B, the determination step S60 determines that a corresponding wireless power receiving circuit is near by the resonant transmitter circuit 120 according to the reflected signal received by the resonant transmitter circuit 120, so the resonant transmitter circuit 120 enters the power supply procedure P200 and starts generating wireless transmitting power.

Please continue referring to FIG. 8B. In one embodiment, the first analog pinging step S10 has an execution period et1, that is, the duration of the first analog pinging transmission signal generated in the first analog pinging step S10 is the execution period et1. In one embodiment, the second analog pinging step S30 has an execution period et2, that is, the duration of the second analog pinging transmission signal generated in the second analog pinging step S30 is the execution period et2. In one embodiment, the digital pinging step S50 has an execution period et3, that is, the duration of the digital pinging transmission signal generated in the digital pinging step S50 is the execution period et3.

In one embodiment, the execution period et3 is longer than the execution period et2, and the power of the second analog pinging transmission signal is less than the power of the digital pinging transmission signal. In one embodiment, the execution period et3 is longer than or equal to 10 times the execution period et2, or the execution period et3 is longer than or equal to 2 times the execution period et2. In one embodiment, the execution period et2 is longer than the execution period et1, and the power of the first analog pinging transmission signal is less than the power of the second analog pinging transmission signal. In one embodiment, the execution period et2 is longer than or equal to 10 times the execution period et1, or the execution period et2 is longer than or equal to 5 times the execution period et1.

It should be noted that, in one embodiment, the relationship between the fourth preset duration dt4 and the first preset duration dt1 is: dt2=dt1−et3. In one embodiment, the relationship between the second preset duration dt2 and the first preset duration dt1 is: dt3=dt1−et2. In one embodiment, the relationship between the third preset duration dt3 and the first preset duration dt1 is: dt4=dt1−et2−et3.

Please refer to FIG. 7B, FIG. 8A, and FIG. 8B at the same time. In FIG. 8A or FIG. 8B, when the operation flow corresponds to the operation flow of FIG. 7B, the operation details are substantially the same as in FIG. 7A, but is different in that, the time interval between the starting points of two neighboring first analog pinging steps S10 in the pinging procedure P100 is always the preset period Tc1, and when the determination result of the determination step S60 is no, it is not necessary to go through the determination step S65.

Please refer to FIG. 4A and FIG. 9. In one embodiment, the transmitter coil current (i.e., the transmitter coil current signal ITC) of the transmitter coil TC in FIG. 4A is a sine wave as shown by the waveform ITC in FIG. 9, and the cross-voltage signal VTC of the transmitter coil TC is also a sine wave as shown by the waveform VTC in FIG. 9. In the present embodiment, the PWM control signal PWM2 having the second analog pinging pattern is a square wave; the second analog pinging transmission signal AGS2 is a sine wave; and the cross-voltage signal VTC is positively correlated to the second analog pinging transmission signal AGS2.

Figure 10:
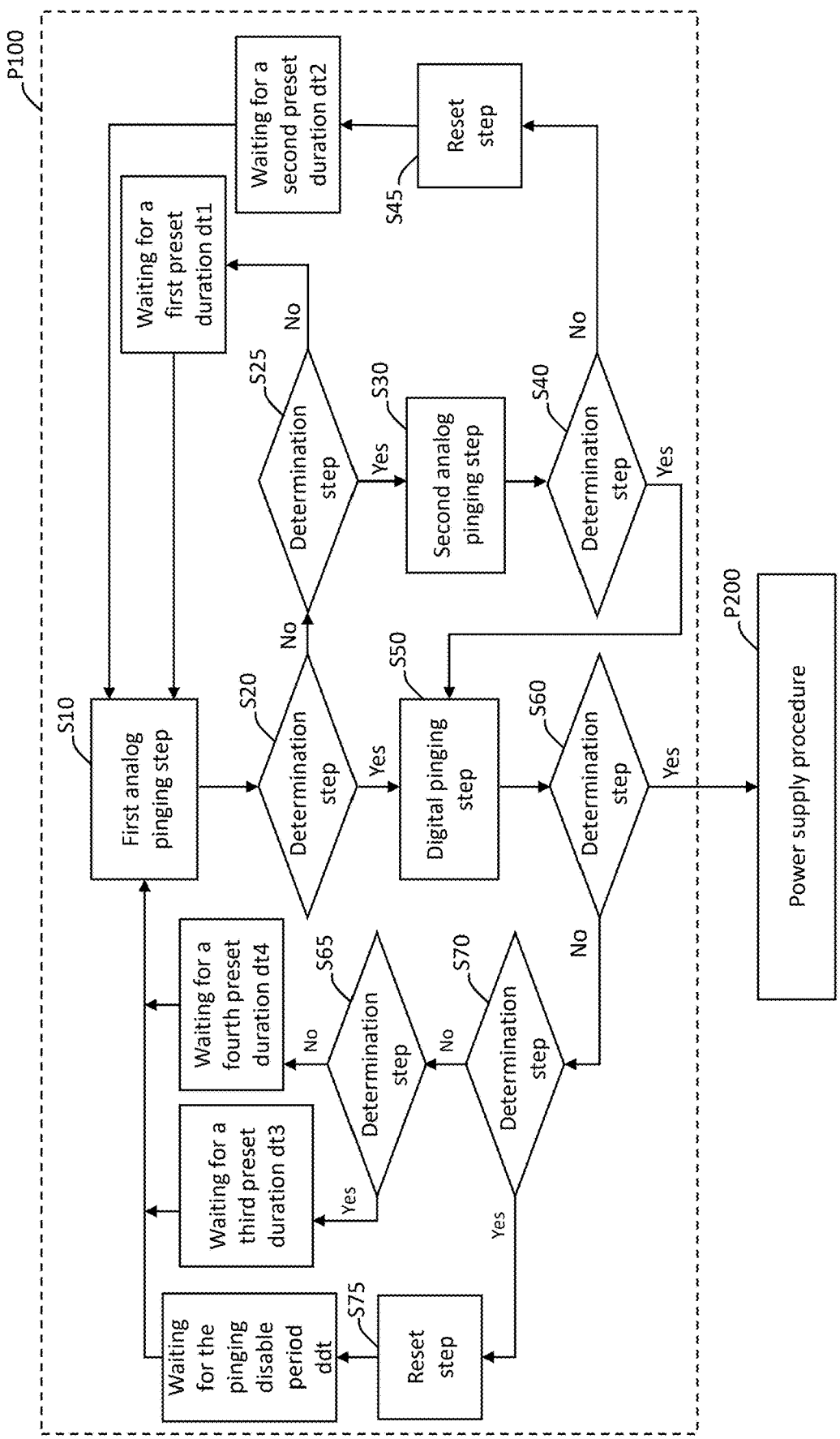
FIG. 10 shows an operation flow chart of the wireless power transmitter circuit according to an embodiment of the present invention.

Please refer to FIG. 10. FIG. 10 shows an operation flow chart of the wireless power transmitter circuit according to an embodiment of the present invention. The operation flow of FIG. 10 is similar to the operation flow of FIG. 7A, but has the differences which are described below. In the embodiment of FIG. 10, the pinging procedure P100 of the wireless power transmitter circuit 1000 further includes: a determination step S25, a reset step S45, a determination step S70, and a reset step S75. In one embodiment, when the determination result of the determination step S20 is no, the pinging procedure P100 enters the determination step S25: determining the number of times the first analog pinging step S10 has been executed, and when the first analog pinging step S10 has been executed n times, entering the second analog pinging step S30, otherwise returning to the first analog pinging step S10 after waiting for the first preset duration dt1, where n is, for example, an integer greater than 1. In one embodiment, when the determination result of the determination step S40 is no, the pinging procedure P100 enters the reset step S45: resetting a count of times of the first analog pinging step S10, and waiting for the second preset duration dt2, and then returning to the first analog pinging step S10. In one embodiment, when the determination result of the determination step S60 is no, the pinging procedure P100 enters the determination step: determining the number of times the digital pinging step S50 has been executed, and when the digital pinging step S50 has been executed m times continuously, the reset step S75 is entered; otherwise, the pinging procedure P100 goes to determination step S65, wherein m is, for example, an integer greater than or equal to 1. In one embodiment, the reset step S75 includes: resetting a count of times of the digital pinging step S50, and next returning to the first analog pinging step S10 after waiting for the pinging disable period ddt.

It should be noted that, similar to the above-mentioned embodiment of FIG. 5B or FIG. 7B, the pinging procedure P100 of the embodiment of FIG. 10 can exclude the determination step S65. In the first analog pinging step S10, a preset period is counted, and when the determination result of the determination step S25 or the determination step S70 is no, or when the reset step S45 ends, the pinging procedure P100 waits for the end of the preset period, and next returns to the first analog pinging step S10; in this embodiment it does not need to distinguish the first preset duration dt1, the fourth preset duration dt4, the second preset duration dt2, or the third preset duration dt3.

Figure 11A:
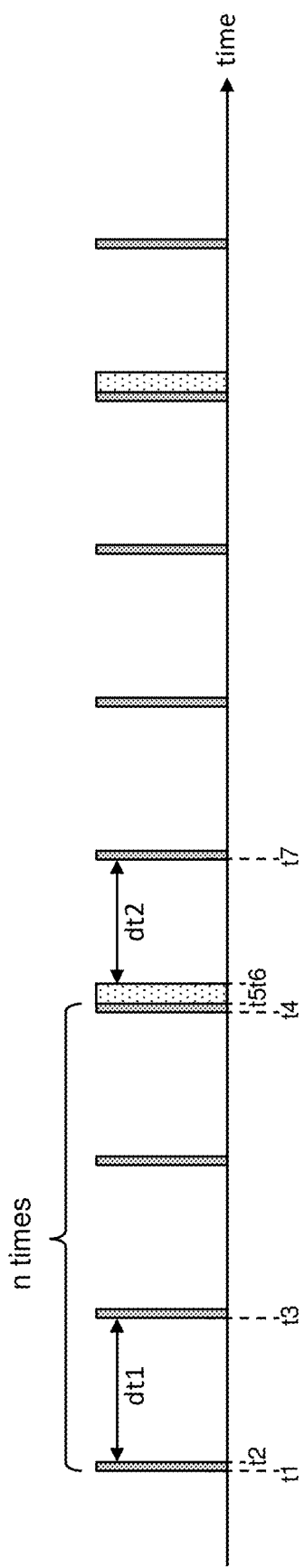
Figure 11C:
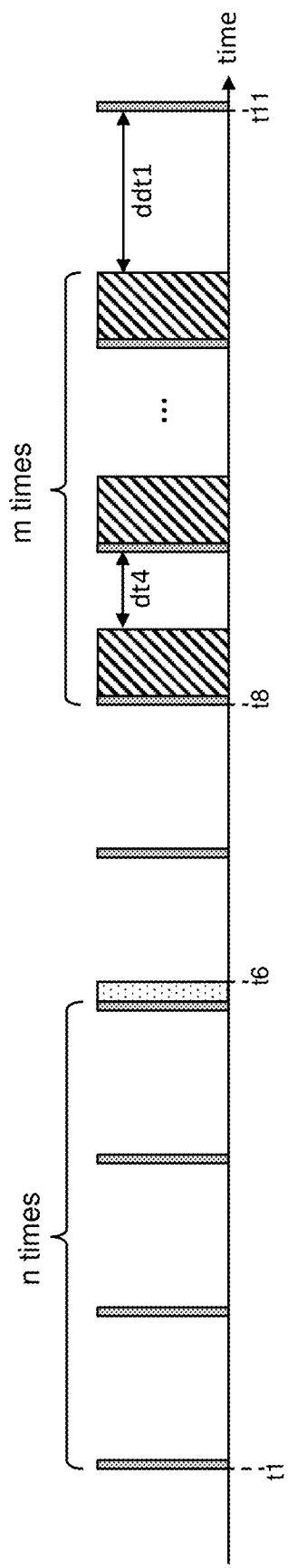

FIG. 11A to 11C respectively show the signal-time relationship diagrams corresponding to FIG. 10 according to several embodiments of the present invention. Please refer to FIG. 10 and FIG. 11A at the same time. In one embodiment, as shown in FIG. 11A, the pinging procedure P100 is entered at time point t1, and the first analog pinging step S10 is executed; next, in the determination step S20 at time point t2, it is determined that there is no electromagnetic inductive object near by the resonant transmitter circuit 120, so the determination step S25 is entered. In the present embodiment, the determination step S25 determines that the first analog pinging step S10 has not been executed n times (in the present embodiment, n is, for example, 4); therefore, after waiting for the first preset duration dt1, the pinging procedure P100 returns to the first analog pinging step S10 at time point t3. The above steps are repeated from time point t3 to time point t4.

In one embodiment, at time point t5 in FIG. 11A, the determination step S20 determines that there is no electromagnetic inductive object near by the resonant transmitter circuit 120, and next the determination step S25 determines that the first analog pinging step S10 has been executed n times and all of the first analog pinging steps S10 determined that there is no electromagnetic inductive object near by the resonant transmitter circuit 120, so the second analog pinging step S30 is entered. Subsequently, at time point t6 in FIG. 11A, the determination step S40 determines that there is still no electromagnetic inductive object near by the resonant transmitter circuit 120, so the reset step S45 is entered to reset a count of times of the first analog pinging step S10, and next after waiting for the second preset duration dt2, the pinging procedure P100 returns to the first analog pinging step S10 at time point t7.

It should be noted that, as shown in FIG. 11A, when there is no electromagnetic inductive object near by the resonant transmitter circuit 120, after executing the first analog pinging step S10 every n times, the second analog pinging step S30 is executed once. It can be seen that the present invention can greatly reduce unnecessary power consumption in the pinging procedure, thereby improving the efficiency of the wireless power transmitter circuit. In addition, since the first electrical characteristic is related to the quality factor of the resonant transmitter circuit, of which the accuracy is lower and it is easier to misjudge, while the second electrical characteristic is related to the voltage across the transmitter coil and/or the transmitter coil current flowing through the transmitter coil, of which the accuracy is higher and it is less likely to be misjudge, therefore, in the present invention, by executing the second analog pinging step S30 after the first analog pinging step S10 has been executed and all n times of determination results are negative, the pinging accuracy can be achieved while reducing the power consumption.

Please refer to FIG. 10, FIG. 11B, and FIG. 11C at the same time. The operation flow from time point t1 to time point t6 in FIG. 11B and FIG. 11C is the same as that in the embodiment of FIG. 11A, which is not repeatedly explained here. In the embodiment of FIG. 11B, at time point t6, the determination step S40 determines that an electromagnetic inductive object is near by the resonant transmitter circuit 120, so the digital pinging step S50 is entered. Subsequently, at time point t6' in FIG. 11B, the determination step S60 determines that there is no corresponding wireless power receiving circuit near by the resonant transmitter circuit 120; and next, the determination step S70 determines that the digital pinging step S50 has not been continuously executed m times, so the determination step S65 is entered, wherein the determination step S65 determines that the present execution has gone through the second analog pinging step S30, so after waiting for the third preset duration dt3, the pinging procedure P100 returns to the first analog pinging step S10 at time point t7. The above steps are repeated from time point t7 to time point t9 in FIG. 11B. At time point t9 in FIG. 11B, the determination step S60 determines that there is no corresponding wireless power receiving circuit near by the resonant transmitter circuit 120; and next, the determination step S70 determines that the digital pinging step S50 has been continuously executed m times, so the reset step S75 is entered to reset a count of times of the digital pinging step S50, and after waiting for the pinging disable period ddt, the pinging procedure P100 returns to the first analog pinging step S10 at time point t10. In one embodiment, the pinging disable period ddt is longer than the aforementioned preset period Tc1.

The operation flow from time point t8 to time point t11 in FIG. 11C is similar to the operation flow from time point t4 to time point t9 in FIG. 11B, but is different in that, during time point t8 to time point t11 in FIG. 11C, all the determination steps S20 determine that there is an electromagnetic inductive object near by the resonant transmitter circuit 120. Therefore, after the first analog pinging step S10 is completed, the pinging procedure P100 directly enters the digital pinging step S50 without executing the second analog pinging step S30.

It should be noted that, as shown in FIG. 11B and FIG. 11C, when an object with electromagnetic inductive characteristics is near by the resonant transmitter circuit 120, and the determination result of the determination step S20 or the determination step S40 is yes, the pinging procedure P100 will enter the digital pinging step S50; however in these two embodiments, there is no wireless power receiving circuit near by, so the digital pinging step S50 will be repeatedly executed. After the digital pinging step S50 has been executed m times, the present invention can disable the pinging for a period of time. More specifically, after the first analog pinging step S10 and the digital pinging step S50 are executed m times, or after the first analog pinging step S10, the second analog pinging step S30 and the digital pinging step S50 are executed m times, the pinging procedure P100 can stop for a period of time (that is, the pinging disable period ddt), thereby further reducing unnecessary power consumption in the pinging procedure, so as to improve the efficiency of the wireless power transmitter circuit and maintain the accuracy of the groping.

Figure 12:
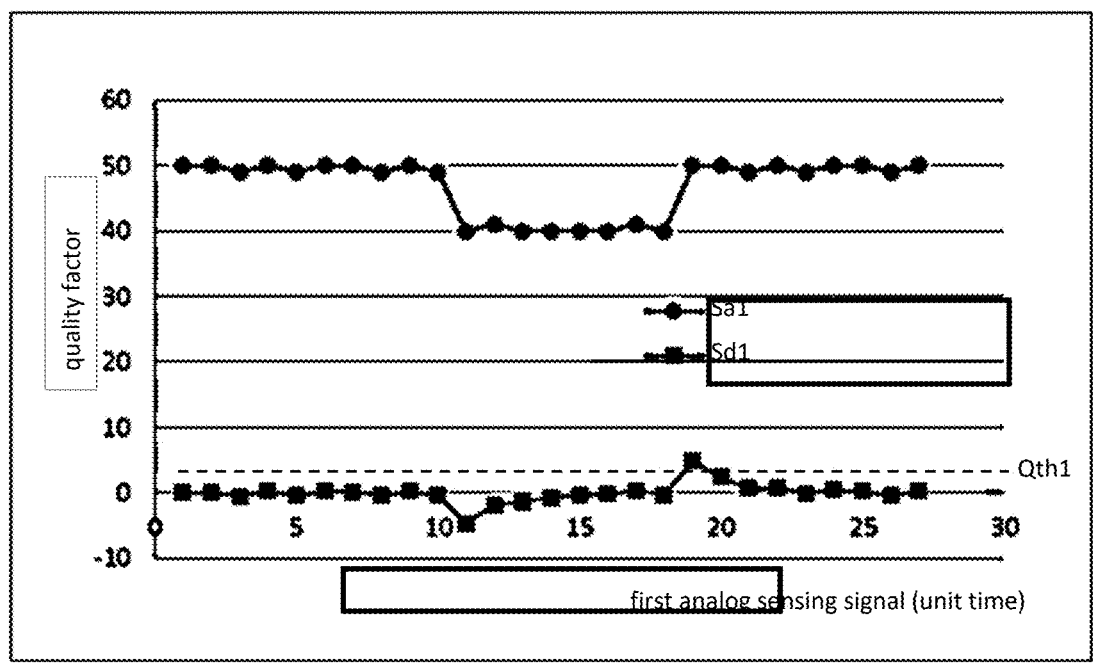
FIG. 12 shows a relationship diagram between the first analog sensing signal and the quality factor (Q factor).

Please refer to FIG. 12. FIG. 12 shows the relationship between the first analog sensing signal and the quality factor (Q factor). In one embodiment, the aforementioned first electrical characteristic is related to the quality factor (Q factor) of the resonant transmitter circuit 120. In one embodiment, the determination step S20 includes: determining whether there is an electromagnetic inductive object near by the resonant transmitter circuit 120 according to whether the absolute value of the first detection signal Sd1 is greater than the first threshold Qth1. Specifically, in one embodiment, when the absolute value of the first detection signal Sd1 is greater than the first threshold Qth1, it is determined that there is an electromagnetic inductive object near by the resonant transmitter circuit 120, wherein the first detection signal Sd1 is related to a time derivative of the quality factor. For the measurement method of the quality factor, reference can be made to, for example, U.S. Pat. No. 10,916,972B2. In one embodiment, in each of the first analog pinging step S10, the quality factor of the resonant transmitter circuit 120 is measured to be the value of the first analog sensing signal Sa1 (each circle point in FIG. 12 represents the value of one first analog sensing signal Sa1), and discrete high-pass filtering is executed on a sequence of multiple values of the first analog sensing signal Sa1 to generate the value of the first detection signal Sd1 (each square point in FIG. 12 represents the value of one first detection signal Sd1); in other words, from one perspective, the first detection signal Sd1 is the time derivative of the first analog detection signal Sa1.

Figure 13A:
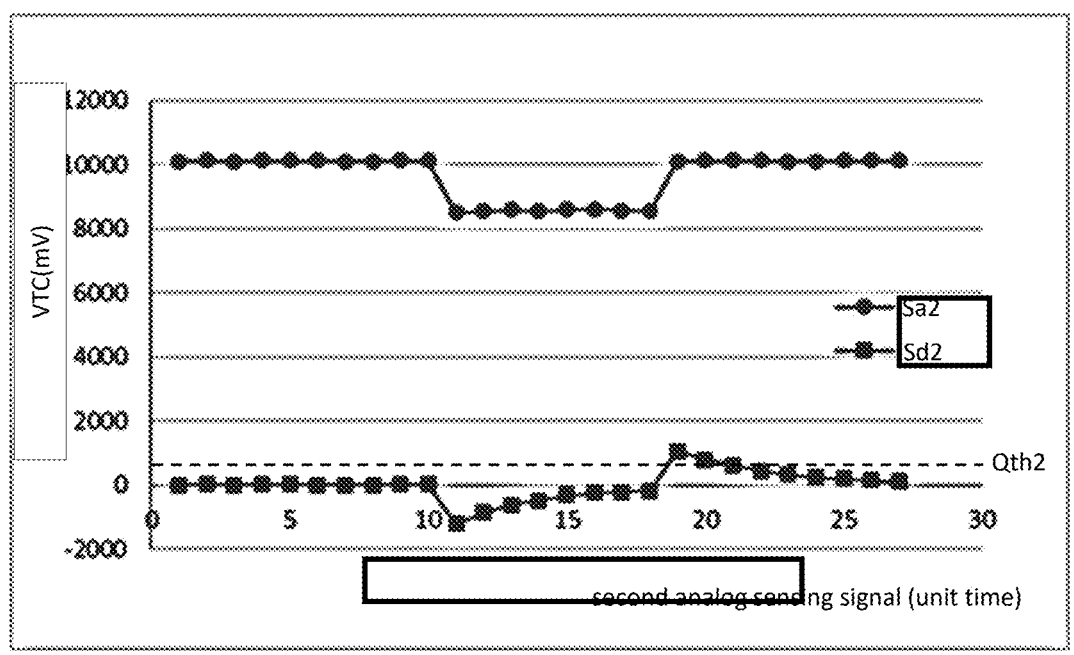
FIG. 13A and FIG. 13B respectively show relationship diagrams among the second analog sensing signal, the voltage across the transmitter coil, and the transmitter coil current.
Figure 13B:
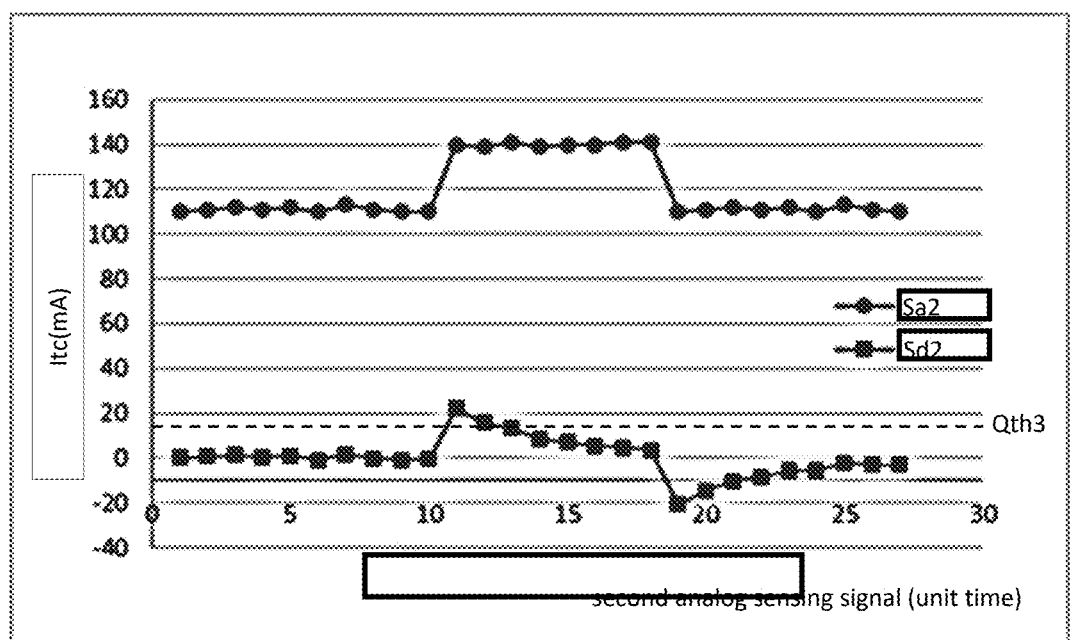

Please refer to FIG. 13A and FIG. 13B. FIG. 13A and FIG. 13B respectively show the relationship diagrams among the second analog sensing signal, the voltage across the transmitter coil (i.e., the cross-voltage signal VTC) and the transmitter coil current (i.e., the transmitter coil current signal Itc). In one embodiment, the aforementioned second electrical characteristic is related to the cross-voltage signal VTC of the transmitter coil TC and/or the transmitter coil current signal Itc flowing through the transmitter coil TC. In one embodiment, the determination step S40 further includes: when the absolute value of the second detection signal Sd2 is greater than the second threshold Qth2 and/or greater than the third threshold Qth3, determining whether there is an electromagnetic inductive object near by the resonant transmitter circuit 120, wherein the second detection signal Sd2 is related to a time derivative of the cross-voltage signal VTC of the transmitter coil TC and/or a time derivative of the transmitter coil current signal Itc, and the second detection signal Sd2 is also related to the voltage and/or current of the resonant capacitor RC. In one embodiment, in each second analog pinging step S30, an average amplitude of the cross-voltage signal VTC of the transmitter coil TC, an average amplitude of the transmitter coil current signal Itc, an average amplitude of the voltage across a resonant capacitor RC, or an average amplitude of a current of the resonant capacitor RC is measured to be a value of the second analog sensing signal Sa2 (each circle point in FIG. 13A or FIG. 13B represents the value of one second analog sensing signal Sa2), and discrete high-pass filtering is executed on a sequence of multiple values of the second analog sensing signal Sa2 to generate the value of the second detection signal Sd2 (each square point in FIG. 13A or FIG. 13B represents the value of one second sensing signal Sd2). In other words, from one perspective, the second detection signal Sd2 is a time derivative of the second analog detection signal Sa2.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A wireless power transmitter circuit, comprising:
    a power stage circuit, comprising a plurality of switches, coupled to a resonant transmitter circuit, wherein the resonant transmitter circuit comprises a transmitter coil and a resonant capacitor coupled to each other; and
    a transmitter control circuit, configured to control the plurality of switches according to a pulse width modulation (PWM) control signal to convert a direct current (DC) power to a wireless transmitting power in the resonant transmitter circuit to wirelessly supply power to a corresponding wireless power receiving circuit in a power supply procedure, the transmitter control circuit being configured to determine whether the corresponding wireless power receiving circuit is near by the resonant transmitter circuit in a pinging procedure, wherein the pinging procedure comprises:
    a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation;
    a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50;
    a digital pinging step S50: generating the PWM control signal having a digital pinging pattern to control the resonant transmitter circuit to generate a corresponding digital pinging transmission signal;
    a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure;
    wherein when the determination result of the determination step S20 is no, selecting to enter one of the following steps:
        a second analog pinging step S30: generating the PWM control signal having a second analog pinging pattern to control the resonant transmitter circuit to generate a corresponding second analog pinging transmission signal, wherein when an electromagnetic inductive object is near by the resonant transmitter circuit, a second electrical characteristic of the second analog pinging transmission signal has a variation; or
        a determination step S25: determining whether the first analog pinging step S10 has been executed n times, wherein when the first analog pinging step S10 has been executed n times, the pinging procedure enters the second analog pinging step S30, otherwise the pinging procedure returns to the first analog pinging step S10 after waiting for a first preset duration; wherein n is an integer equal to or greater than 1;
    wherein after performing the second analog pinging step S30, proceeding to a determination step S40: determining whether the electromagnetic inductive object is near by the resonant transmitter circuit according to the second electrical characteristic, and when determining that the electromagnetic inductive object is near by the resonant transmitter circuit, entering the digital pinging step S50.

2. The wireless power transmitter circuit of claim 1, wherein the first analog pinging step S10 optionally further comprises timing a preset period;

wherein when the determination result of the determination step S40 is no, selecting to enter one of the following steps:
returning to the first analog pinging step S10 after waiting for a second preset duration; or
returning to the first analog pinging step S10 when the preset period ends; or
a reset step S45: resetting the execution count of the first analog pinging step S10, and then returning to the first analog pinging step S10 after waiting for the second preset duration.

3. The wireless power transmitter circuit of claim 2, second preset duration
wherein if the first analog pinging step S10 includes timing the preset period, then when the determination result of the determination step S40 is no, selecting to wait for the preset period to end and then return to the first analog pinging step S10;
wherein if the determination result of the determination step S20 is no and the determination step S25 is selected to be entered, then when the determination result of the determination step S40 is no, selecting to enter the reset step S45.

4. The wireless power transmitter circuit of claim 1, wherein the first analog pinging step S10 optionally further comprises timing a preset period;
wherein when the determination result of the determination step S60 is no, selecting to enter one of the following steps:
returning to the first analog pinging step S10 when the preset period ends; or
a determination step S65: determining whether the present pinging procedure has executed the second analog groping step S30, and when determining that the second analog groping step S30 has been executed, returning to the first analog groping step S10 after waiting for a third preset duration, otherwise returning to the first analog groping step S10 after waiting for a fourth preset duration; or
a determination step S70: determining whether the digital pinging step S50 has been executed m times, wherein when the digital pinging step S50 has not yet been continuously executed m times, entering the determination step S65.

5. The wireless power transmitter circuit of claim 4,
wherein if the first analog pinging step S10 includes timing the preset period, then when the determination result of the determination step S60 is no, selecting to wait for the preset period to end and then return to the first analog pinging step S10;
wherein when the determination result of the determination step S70 is yes, entering a reset step S75, wherein the reset step S75 comprising: resetting the execution count of the digital pinging step S50, and then returning to the first analog pinging step S10 after waiting for a pinging disable period.

6. The wireless power transmitter circuit of claim 1, wherein the digital pinging step S50 has a first execution period and the second analog pinging step S30 has a second execution period, wherein the first execution period is longer than the second execution period; and
wherein the power of the second analog pinging transmission signal is less than the power of the digital pinging transmission signal.

7. The wireless power transmitter circuit of claim 4, wherein the first execution period is longer than or equal to 10 times the second execution period, or the first execution period is longer than or equal to 2 times the second execution period.

8. The wireless power transmitter circuit of claim 4, wherein the first analog pinging step S10 has a third execution period, and the second execution period is longer than the third execution period; and
wherein the power of the first analog pinging transmission signal is less than the power of the second analog pinging transmission signal.

9. The wireless power transmitter circuit of claim 6, wherein the second execution period is longer than or equal to 10 times the third execution period, or the second execution period is longer than or equal to 5 times the third execution period.

10. The wireless power transmitter circuit of claim 1, wherein the first electrical characteristic is related to an equivalent quality factor (Q factor) of the resonant transmitter circuit, wherein when the resonant transmitter circuit transmits the first analog pinging transmission signal in the first analog pinging step S10, the equivalent quality factor varies based on whether an electromagnetic inductive object is near by the resonant transmitter circuit, thereby allowing the determination step S20 to determine whether an electromagnetic inductive object is near by the resonant transmitter circuit according to the equivalent quality factor.

11. The wireless power transmitter circuit of claim 10, wherein the determination step S20 further comprises: when an absolute value of a first detection signal is greater than a first threshold, determining whether the electromagnetic inductive object is near by the resonant transmitter circuit, wherein the first detection signal is related to a time derivative of the equivalent quality factor.

12. The wireless power transmitter circuit of claim 10, wherein each of the first analog pinging step S10 further comprises: measuring the equivalent quality factor of the resonant transmitter circuit while transmitting the first analog pinging transmission signal, to serve as a value of a first analog sensing signal, and subjecting a sequence of multiple values of the first analog sensing signal to a discrete high-pass filtering procedure to generate the value of the first detection signal.

13. The wireless power transmitter circuit of claim 1, wherein the second electrical characteristic is related to a voltage across the transmitter coil and/or a transmitter coil current flowing through the transmitter coil.

14. The wireless power transmitter circuit of claim 13, wherein the determination step S40 further comprises: when an absolute value of a second detection signal is greater than a second threshold and/or greater than a third threshold, determining whether the electromagnetic inductive object is near by the resonant transmitter circuit, wherein the second detection signal is related to a time derivative of the voltage across the transmitter coil and/or a time derivative of the transmitter coil current.

15. The wireless power transmitter circuit of claim 14, wherein in each of the second analog pinging step S30, an average amplitude of the voltage across the transmitter coil, an average amplitude of the transmitter coil current, an average amplitude of the voltage across a resonant capacitor, or an average amplitude of a current of the resonant capacitor is measured to be a value of a second analog sensing signal, and a sequence of multiple values of the second analog sensing signal are subject to a discrete high-pass filtering procedure to generate the value of the second detection signal.

16. The wireless power transmitter circuit of claim 1, wherein the determination step S60 further comprises determining whether a corresponding wireless power receiving circuit is near by the resonant transmitter circuit according to whether the reflected signal complies with a communication protocol of in-band communication.

17. The wireless power transmitter circuit of claim 1, wherein the transmitter control circuit comprises:
   a current sensor, configured to sense a transmitter coil current flowing through the transmitter coil to generate an analog current sensing signal; and/or
   a voltage sensor, configured to sense the voltage across the transmitter coil to generate an analog voltage sensing signal;
   wherein the transmitter control circuit is configured to generate the PWM control signal according to the analog current sensing signal and/or the analog voltage sensing signal, thereby controlling the plurality of switches.

18. A transmitter control circuit configured to control a wireless power transmitter circuit, wherein the wireless power transmitter circuit comprises: a power stage circuit which includes a plurality of switches and is coupled to a resonant transmitter circuit, wherein the resonant transmitter circuit comprises a transmitter coil and a resonant capacitor coupled to each other; the transmitter control circuit being configured to control the plurality of switches to convert a direct current (DC) power according to a pulse width modulation (PWM) control signal and generate a wireless transmitting power in the resonant transmitter circuit to wirelessly supply power to a corresponding wireless power receiving circuit in a power supply procedure, wherein the transmitter control circuit comprises:
   a current sensor, configured to sense a transmitter coil current flowing through the transmitter coil to generate an analog current sensing signal; and/or a voltage sensor, configured to sense the voltage across the transmitter coil to generate an analog voltage sensing signal; and
   a sub-control circuit, wherein the sub-control circuit is configured to generate the PWM control signal according to the analog current sensing signal and/or the analog voltage sensing signal, thereby controlling the plurality of switches; wherein the sub-control circuit is configured to determine whether the corresponding wireless power receiving circuit is near by the resonant transmitter circuit in a pinging procedure, wherein the pinging procedure comprises:
   a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation;
   a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50;
   a digital pinging step S50: generating the PWM control signal having a digital pinging pattern to control the resonant transmitter circuit to generate a corresponding digital pinging transmission signal; and
   a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure;
   wherein when the determination result of the determination step S20 is no, selecting to enter one of the following steps:
      a second analog pinging step S30: generating the PWM control signal having a second analog pinging pattern to control the resonant transmitter circuit to generate a corresponding second analog pinging transmission signal, wherein when an electromagnetic inductive object is near by the resonant transmitter circuit, a second electrical characteristic of the second analog pinging transmission signal has a variation; or
      a determination step S25: determining whether the first analog pinging step S10 has been executed n times, wherein when the first analog pinging step S10 has been executed n times, the pinging procedure enters the second analog pinging step S30, otherwise the pinging procedure returns to the first analog pinging step S10 after waiting for a first preset duration; wherein n is an integer equal to or greater than 1;
   wherein after performing the second analog pinging step S30, proceeding to a determination step S40: determining whether the electromagnetic inductive object is near by the resonant transmitter circuit according to the second electrical characteristic, and when determining that the electromagnetic inductive object is near by the resonant transmitter circuit, entering the digital pinging step S50.

19. The transmitter control circuit of claim 18, wherein the first analog pinging step S10 optionally further comprises timing a preset period;
   wherein when the determination result of the determination step S40 is no, selecting to enter one of the following steps:
   returning to the first analog pinging step S10 after waiting for a second preset duration; or
   returning to the first analog pinging step S10 when the preset period ends; or
   a reset step S45: resetting the execution count of the first analog pinging step S10, and then returning to the first analog pinging step S10 after waiting for the second preset duration.

20. The transmitter control circuit of claim 18, wherein the first analog pinging step S10 optionally further comprises timing a preset period;
   wherein when the determination result of the determination step S60 is no, selecting to enter one of the following steps:
   returning to the first analog pinging step S10 when the preset period ends; or
   a determination step S65: determining whether the present pinging procedure has executed the second analog groping step S30, and when determining that the second analog groping step S30 has been executed, returning to the first analog groping step S10 after waiting for a third preset duration, otherwise returning to the first analog groping step S10 after waiting for a fourth preset duration; or
   a determination step S70: determining whether the digital pinging step S50 has been executed m times, wherein when the digital pinging step S50 has not yet been continuously executed m times, entering the determination step S65.

21. The transmitter control circuit of claim 18, wherein the digital pinging step S50 has a first execution period and the second analog pinging step S30 has a second execution period, wherein the first execution period is longer than the second execution period; and
wherein the power of the second analog pinging transmission signal is less than the power of the digital pinging transmission signal.

22. The transmitter control circuit of claim 21, wherein the first analog pinging step S10 has a third execution period, and the second execution period is longer than the third execution period; and
wherein the power of the first analog pinging transmission signal is less than the power of the second analog pinging transmission signal.

23. The transmitter control circuit of claim 18, wherein the first electrical characteristic is related to an equivalent quality factor (Q factor) of the resonant transmitter circuit, wherein when the resonant transmitter circuit transmits the first analog pinging transmission signal in the first analog pinging step S10, the equivalent quality factor varies based on whether an electromagnetic inductive object is near by the resonant transmitter circuit, thereby allowing the determination step S20 to determine whether an electromagnetic inductive object is near by the resonant transmitter circuit according to the equivalent quality factor; and
wherein the second electrical characteristic is related to a voltage across the transmitter coil and/or a transmitter coil current through the transmitter coil.

24. A transmission control method configured to control a wireless power transmitter circuit, comprising:
a power supply procedure: controlling the wireless power transmitter circuit to generate a wireless transmitting power to wirelessly supply power to a corresponding wireless power receiving circuit; and
a pinging procedure: determining whether a corresponding wireless power receiving circuit is near by the wireless power transmitter circuit, wherein the pinging procedure comprises:
a first analog pinging step S10: generating the PWM control signal having a first analog pinging pattern, so as to control the resonant transmitter circuit to generate a corresponding first analog pinging transmission signal, wherein when an electromagnetic inductive object is near by the resonant transmitter circuit, a first electrical characteristic of the first analog pinging transmission signal has a variation;
a determination step S20: determining whether the electromagnetic inductive object is near by the resonant transmitter circuit according to the first electrical characteristic, and when determining that the electromagnetic inductive object is near by the resonant transmitter circuit, entering a digital pinging step S50;
a digital pinging step S50: generating the PWM control signal having a digital pinging pattern to control the resonant transmitter circuit to generate a corresponding digital pinging transmission signal; and
a determination step S60: determining whether a corresponding wireless power receiving circuit is near by the resonant transmitter circuit according to a reflected signal received by the resonant transmitter circuit, and when determining that a corresponding wireless power receiving circuit is near by the resonant transmitter circuit, entering the power supply procedure;
wherein when the determination result of the determination step S20 is no, selecting to enter one of the following steps:
a second analog pinging step S30: generating the PWM control signal having a second analog pinging pattern to control the resonant transmitter circuit to generate a corresponding second analog pinging transmission signal, wherein when an electromagnetic inductive object is near by the resonant transmitter circuit, a second electrical characteristic of the second analog pinging transmission signal has a variation; or
a determination step S25: determining whether the first analog pinging step S10 has been executed n times, wherein when the first analog pinging step S10 has been executed n times, the pinging procedure enters the second analog pinging step S30, otherwise the pinging procedure returns to the first analog pinging step S10 after waiting for a first preset duration; wherein n is an integer equal to or greater than 1;
wherein after performing the second analog pinging step S30, proceeding to a determination step S40: determining whether the electromagnetic inductive object is near by the resonant transmitter circuit according to the second electrical characteristic, and when determining that the electromagnetic inductive object is near by the resonant transmitter circuit, entering the digital pinging step S50.

25. The transmission control method of claim 24, wherein the first analog pinging step S10 optionally further comprises timing a preset period;
wherein when the determination result of the determination step S40 is no, selecting to enter one of the following steps:
returning to the first analog pinging step S10 after waiting for a second preset duration; or
returning to the first analog pinging step S10 when the preset period ends; or
a reset step S45: resetting the execution count of the first analog pinging step S10, and then returning to the first analog pinging step S10 after waiting for the second preset duration.

26. The transmitter control circuit of claim 25, wherein if the first analog pinging step S10 includes timing the preset period, then when the determination result of the determination step S40 is no, selecting to wait for the preset period to end and then return to the first analog pinging step S10;
wherein if the determination result of the determination step S20 is no and the determination step S25 is selected to be entered, then when the determination result of the determination step S40 is no, selecting to enter the reset step S45.

27. The transmission control method of claim 24, wherein the first analog pinging step S10 optionally further comprises timing a preset period;
wherein when the determination result of the determination step S60 is no, selecting to enter one of the following steps:
returning to the first analog pinging step S10 when the preset period ends; or
a determination step S65: determining whether the present pinging procedure has executed the second analog groping step S30, and when determining that the second analog groping step S30 has been executed, returning to the first analog groping step S10 after waiting for a third preset duration, otherwise returning to the first analog groping step S10 after waiting for a fourth preset duration; or a determination step S70: determining whether the digital pinging step S50 has been executed m times, wherein when the digital pinging step S50 has not yet been continuously executed m times, entering the determination step S65.

28. The transmitter control circuit of claim 27, wherein if the first analog pinging step S10 includes timing the preset period, then when the determination result of the determination step S60 is no, selecting to wait for the preset period to end and then return to the first analog pinging step S10;

wherein when the determination result of the determination step S70 is yes, entering a reset step S75, wherein the reset step S75 comprising: resetting the execution count of the digital pinging step S50, and then returning to the first analog pinging step S10 after waiting for a pinging disable period.

29. The transmission control method of claim 24, wherein the digital pinging step S50 has a first execution period, and the second analog pinging step S30 has a second execution period, wherein the first execution period is longer than the second execution period; and wherein the power of the second analog pinging transmission signal is less than the power of the digital pinging transmission signal.

30. The transmission control method of claim 29, wherein the first analog pinging step S10 has a third execution period, and the second execution period is longer than the third execution period; and wherein the power of the first analog pinging transmission signal is less than the power of the second analog pinging transmission signal.

31. The transmitter control method of claim 24, wherein the wireless power transmitter circuit is configured to control a resonant transmitter circuit to generate the wireless transmitting power, the first analog pinging transmission signal, and the second analog pinging transmission signal, wherein the resonant transmitter circuit comprises a transmitter coil and a resonant capacitor coupled to each other, and;

wherein the first electrical characteristic is related to an equivalent quality factor (Q factor) of the resonant transmitter circuit, wherein when the resonant transmitter circuit transmits the first analog pinging transmission signal in the first analog pinging step S10, the equivalent quality factor varies based on whether an electromagnetic inductive object is near by the resonant transmitter circuit, thereby allowing the determination step S20 to determine whether an electromagnetic inductive object is near by the resonant transmitter circuit according to the equivalent quality factor; and wherein the second electrical characteristic is related to a voltage across the transmitter coil and/or a transmitter coil current flowing through the transmitter coil.

* * * * *